US012626952B2

(12) United States Patent
Choi et al.

(10) Patent No.: US 12,626,952 B2
(45) Date of Patent: *May 12, 2026

(54) SOLID ION CONDUCTOR COMPOUND, ELECTROCHEMICAL CELL COMPRISING THE SAME, AND PREPARATION METHOD THEREOF

(71) Applicant: Samsung Electronics Co., Ltd., Suwon-si (KR)

(72) Inventors: Wonsung Choi, Suwon-si (KR); Jusik Kim, Suwon-si (KR); Gabin Yoon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 598 days.

This patent is subject to a terminal disclaimer.

(21) Appl. No.: 18/059,549

(22) Filed: Nov. 29, 2022

(65) Prior Publication Data

US 2023/0170524 A1    Jun. 1, 2023

(30) Foreign Application Priority Data

Dec. 1, 2021    (KR) ......................... 10-2021-0170364
Oct. 5, 2022    (KR) ......................... 10-2022-0127173

(51) Int. Cl.
H01M 10/0562        (2010.01)

(52) U.S. Cl.
CPC .. H01M 10/0562 (2013.01); H01M 2300/008 (2013.01)

(58) Field of Classification Search
None
See application file for complete search history.

(56) References Cited

U.S. PATENT DOCUMENTS

| | | | | |
|---|---|---|---|---|
| 11,670,775 B2 * | 6/2023 | Sasaki | ............... | H01M 10/0525 |
| | | | | 429/323 |
| 11,735,765 B2 * | 8/2023 | Choi | .................. | C04B 35/5152 |
| | | | | 429/403 |
| 2019/0296347 A1 * | 9/2019 | Sakai | ................ | H01M 10/0525 |
| 2020/0212478 A1 * | 7/2020 | Sakai | .................. | H01M 10/052 |
| 2020/0350625 A1 | 11/2020 | Sugimoto et al. | | |
| 2021/0098824 A1 | 4/2021 | Nishio et al. | | |
| 2021/0098825 A1 * | 4/2021 | Sakaida | ............ | H01M 10/0562 |
| 2021/0135278 A1 | 5/2021 | Kim et al. | | |
| 2021/0320327 A1 | 10/2021 | Ouspenski et al. | | |

| | | | | |
|---|---|---|---|---|
| 2022/0006116 A1 * | 1/2022 | Choi | ................ | H01M 10/0562 |
| 2022/0149426 A1 * | 5/2022 | Yoon | ................... | H01M 10/052 |
| 2023/0084324 A1 * | 3/2023 | Ryu | ...................... | H01M 4/583 |
| | | | | 429/231.95 |
| 2023/0178720 A1 * | 6/2023 | Tomita | ................. | C01G 33/006 |
| | | | | 429/229 |
| 2024/0063383 A1 * | 2/2024 | Nagao | ................... | H01M 4/525 |
| 2024/0105936 A1 * | 3/2024 | Hamamura | .......... | H01M 4/505 |
| 2024/0120524 A1 | 4/2024 | Ueno et al. | | |
| 2024/0162482 A1 * | 5/2024 | Iwasaki | ................. | H01M 4/136 |
| 2024/0178445 A1 * | 5/2024 | Minami | ............ | H01M 10/0562 |
| 2024/0413385 A1 * | 12/2024 | Ueno | ....................... | H01B 1/06 |

FOREIGN PATENT DOCUMENTS

| | | |
|---|---|---|
| JP | 2020109047 A | 7/2020 |
| JP | 6947321 B1 | 9/2021 |
| KR | 20180076131 A | 7/2018 |
| KR | 20210054817 A | 5/2021 |
| WO | 2019146293 A1 | 8/2019 |
| WO | 2020070956 A1 | 4/2020 |
| WO | 2020070958 A1 | 4/2020 |

OTHER PUBLICATIONS

Kwak et al.," New Cost-Effective Halide Solid Electrolytes for All-Solid-State Batteries: Mechanochemically Prepared Fe3+-Substituted Li2ZrCl6", Advanced Energy Material, 11, 2021 2003190.
Wang et al., "Hydrogen Peroxide Assisted Synthesis of Highly Luminescent Sulfur Quantum Dots", Angewandte, Chem. Int. Ed. 2019, 58, 7040-7044.
Korean Office Action for Korean Patent Application No. 10-2022-0127173 dated Apr. 22, 2024.

* cited by examiner

*Primary Examiner* — Kevin M Bernatz
(74) *Attorney, Agent, or Firm* — CANTOR COLBURN LLP

(57)        ABSTRACT

A solid ion conductor compound represented by Formula 1, an electrochemical cell including the same, and a method of preparing the solid ion conductor compound. The solid ion conductor is a compound of Formula 1

$$\text{Li}_a\text{M}_b\text{Zr}_c\text{X}_d\text{T}_e \qquad \text{Formula 1}$$

wherein in Formula 1, $1 < a < 3.5$, $0 < b < 1.5$, $0 < c < 1.5$, $0 < d < 7$, $0 \le e < 1$, $0 < b/d < 0.03$, and $0.05 < c/d < 0.18$,
M is at least one monovalent metal element other than lithium, and
T is a metal element different from M, a transition metal element, a post-transition metal element, a metalloid element, or a combination thereof,
wherein an ionic radius of M satisfies $90 \text{ pm} < \text{M}_r \le 180 \text{ pm}$, wherein $\text{M}_r$ is an ionic radius of M, and X is at least one halogen.

20 Claims, 8 Drawing Sheets

SOLID ION CONDUCTOR COMPOUND, ELECTROCHEMICAL CELL COMPRISING THE SAME, AND PREPARATION METHOD THEREOF

CROSS-REFERENCE TO RELATED APPLICATIONS

This application is based on and claims priority to Korean Patent Application No. 10-2021-0170364, filed on Dec. 1, 2021, and Korean Patent Application No. 10-2022-0127173, filed on Oct. 5, 2022, in the Korean Intellectual Property Office, and all the benefits accruing therefrom under 35 U.S.C. § 119, the contents of which are incorporated by reference herein in their entirety.

BACKGROUND

1. Field

Disclosed is a solid ion conductor compound, an electrochemical cell including the same, and a method of preparing the same.

2. Description of the Related Art

Electrochemical cells, for example, all-solid-state batteries include a solid electrolyte as an electrolyte. All-solid-state batteries do not contain flammable organic solvents, and thus exhibit excellent stability.

Solid electrolyte materials in the art are limited in that they are not sufficiently stable with respect to lithium metal and have low lithium ion conductivity. To address the aforementioned and other issues, sulfide-based solid electrolytes, halogen-based solid electrolytes, and oxide-based solid electrolytes have been studied.

In particular, sulfide-based solid electrolytes and oxide-based solid electrolytes have the advantage of having high ionic conductivity, but sulfide-based solid electrolytes generate toxic gas by reacting with water, and oxide-based solid electrolytes have low formability.

In contrast, halogen-based solid electrolytes have attracted attention in that they do not react with water to generate toxic gas and yet exhibit excellent formability. However, the halogen-based solid electrolytes developed thus far are limited in that they do not have satisfactory ionic conductivity, or have insufficient stability.

In this context, there is a need for a halogen-based solid electrolyte having high ionic conductivity and improved stability.

SUMMARY

Provided are a novel solid ion conductor compound having excellent lithium ion conductivity, an electrochemical cell including the same, and a method of preparing the same.

Additional aspects will be set forth in part in the description which follows and, in part, will be apparent from the description, or may be learned by practice of the presented embodiments of the disclosure.

According to one aspect, provided is a solid ion conductor compound represented by Formula 1.

$$Li_aM_bZr_cX_dT_e \qquad \text{Formula 1}$$

In Formula 1, $1<a<3.5$, $0<b<1.5$, $0<c<1.5$, $0<d<7$, $0 \le e<1$, $0<b/d<0.03$, and $0.05<c/d<0.18$, M is at least one monovalent metal element other than lithium, and T is a metal element different from M, a transition metal element, a post-transition metal element, a metalloid element, or a combination thereof, wherein an ionic radius of M is 90 pm$<M_r \le 180$ pm, wherein $M_r$ is an ionic radius of M, and X is at least one halogen element.

According to another aspect, provided is a method of preparing a solid ion conductor compound, the method including: providing a mixture of a zirconium precursor compound, a lithium precursor compound, and a metal M precursor compound, wherein the metal element M is at least one monovalent metal element other than lithium, and the metal element M has an ionic radius of 90 pm$<M_r<180$ pm, wherein $M_r$ is an ionic radius of M; and treating the mixture to form the solid ion conductor compound.

According to another aspect, provided is an electrochemical cell including: a cathode layer including a cathode active material layer; an anode layer including an anode active material layer; and a solid electrolyte layer disposed between the cathode layer and the anode layer, wherein at least one of the cathode layer and the solid electrolyte layer includes the solid ion conductor compound.

Here, the electrochemical cell may be, for example, an all-solid-state secondary battery, a secondary battery containing a liquid electrolyte, or a lithium-air battery.

Also disclosed is a cathode active material layer including the solid ion conductor compound.

Also disclosed is a cathode-electrolyte subassembly including the cathode active material layer and an electrolyte layer on the cathode active material layer, the electrolyte including the solid ion conductor compound.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
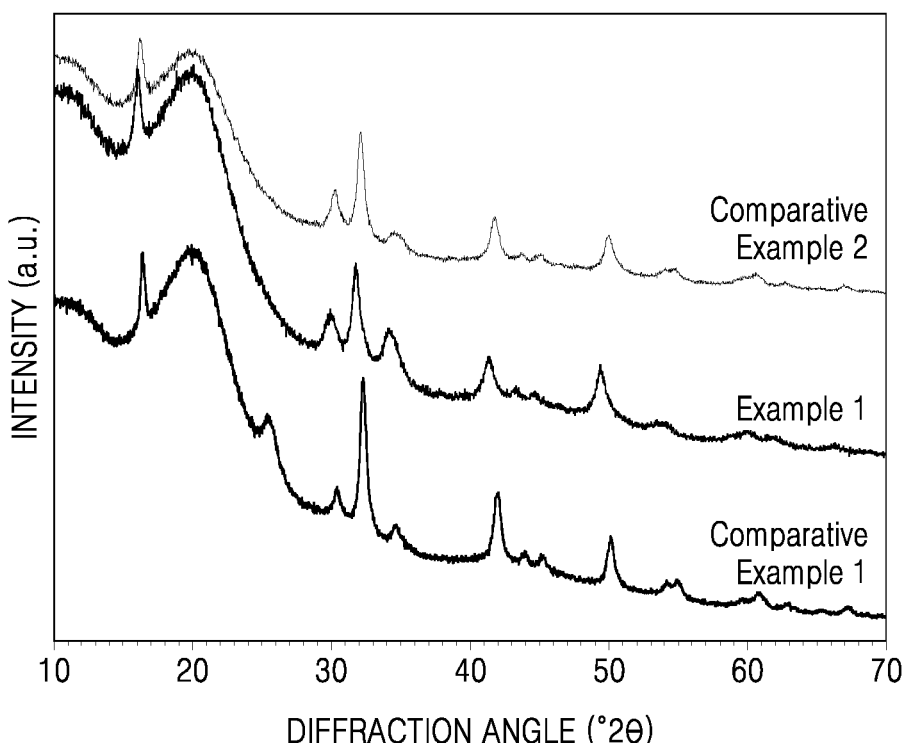
FIG. 1 is a graph of intensity (arbitrary units, a.u.) versus diffraction angle (°2θ) showing an XRD spectrum for the solid ion conductor compounds prepared in Example 1 and Comparative Examples 1 and 2.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Various embodiments are illustrated in the accompanied drawings. However, the present inventive concept may be implemented in various other forms and should not be construed as being limited to the embodiments described in the present specification. Rather, the present embodiments are provided for a full understanding of the present inventive concept and to sufficiently convey the scope of the present inventive concept to those of ordinary skill in the art in the relevant technical field. Like reference numerals may refer to like elements.

It will be understood that when one element is referred to as being "on" or "above" another element, it can be directly on the other element or intervening elements may be present therebetween. In contrast, when one element is referred to as being "directly on" another element, there is no other element present therebetween.

Although the terms "first," "second," "third," etc. may be used herein to describe various elements, components, areas, layers, and/or regions, these elements, components, areas, layers, and/or regions should not be limited by these terms. These terms are only used to distinguish one element, component, area, layer, and/or region from another element, component, area, layer, and/or region. Therefore, the first element, component, area, layer, and/or region described herein may be referred to as the second element, component, area, layer, and/or region, without departing the teaching of the present application.

The terms used herein are only to describe a particular embodiment and should not be construed as limiting the present inventive concept. As used herein, the singular are intended to include the plural forms including "at least one" as well, unless the context clearly indicates otherwise. The term "at least one" shall not be construed as being limited to a singular form. As used herein, the term "and/or" may be interpreted as including any and all combinations of one or more of the listed components. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, spatially relative terms such as "below," "under," "lower part," "above," "on," and "upper part," may be used to describe the relationship between one element or feature and another element or feature. Spatially relative terms shall be understood as being used in conjunction with the directions illustrated in the drawings, or as including different directions of a device when operating. For example, the device in the drawings is flipped, the element described as being "below" or "under" another element or feature should be oriented as being "above" another element or feature. Therefore, the term "below" may include both above and below directions. The device may be oriented in different directions (may be rotated by 90 degrees or in another direction), the spatially relative terms used herein shall be interpreted accordingly.

Unless otherwise defined, all terms used in the present application (including technical and scientific terms) have the same meaning as generally understood by those of ordinary skill in the art in the technical field to which the present disclosure belongs. Further, the terminology as defined in the commonly used dictionary shall be interpreted as having the meaning appropriate to the context in the related technology and the present disclosure, and shall not be interpreted as having an idealized or excessively formal meaning.

Example embodiments will be described in conjunction with the cross-sectional views that are schematic views of idealized embodiments. As such, modifications from the illustrated forms, as a result of manufacturing technique and/or acceptable errors, etc. shall be expected. Therefore, the embodiments described in the present specification shall not be understood as being limited to particular forms of the regions illustrated herein, but shall be understood as including variations in form resulting from manufacturing, for example. For example, regions illustrated or described as being flat may typically have a roughness and/or a non-linear feature. Further, an angle illustrated as acute may be round. Accordingly, the regions illustrated in the drawings are essentially schematic and are not provided to illustrate the accurate form of the corresponding form, and shall not be construed as limiting the scope of the claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

The term "Group" refers to a Group in the periodic table according to 1-18 Group classification system of The International Union of Pure and Applied Chemistry (IUPAC).

Although particular embodiments are described, alternatives, modifications, changes, improvements, and substantial equivalents that are not or cannot be presently predicted may occur to the applicant or those of ordinary skill in the art. Therefore, the accompanied claims that are submitted and amendable are intended to encompass all such alternatives, modifications, changes, improvements and substantial equivalents.

Herein, a solid ion conductor compound, an electrochemical cell including the same, and a method of preparing the solid ion conductor compound according to one or more examples will be described in further detail.

Solid Ion Conductor Compound

A solid ion conductor compound according to an aspect is be represented by Formula 1.

$$Li_a M_b Zr_c X_d T_e \qquad \text{Formula 1}$$

In Formula 1, the element M is at least one monovalent metal element other than lithium, and an ionic radius ($M_r$) of the element M is 90 pm<$M_r$≤180 pm. Here, the ionic radius ($M_r$) refers to the radius of a monatomic ion within an ionic crystal structure.

According to an embodiment, the element M may include Na, K, Rb, Mo(I), Cu(I), Hg, Ag, Au, Tl, or a combination thereof. For example, the element M may include Na, K, Cu(I), Ag, or a combination thereof.

According to an embodiment, $M_r$ of the element M may be 90 pm (picometers)<$M_r$≤175 pm, 90 pm<$M_r$≤170 pm, 90 pm<$M_r$≤165 pm, 90 pm<$M_r$≤160 pm, or 90 pm<$M_r$≤155 pm, but is not limited thereto, and may be 90 pm<$M_r$≤175 pm, 100 pm<$M_r$≤165 pm, 110 pm<$M_r$≤155 pm, or 120 pm<$M_r$≤155 pm.

In an aspect, the ionic radius $M_r$ of the element M is larger than the ionic radius of a Li ion, and when satisfying the aforementioned ranges and while not wanting to be bound by theory, can increase a lattice constant without collapse of the crystal structure in the solid ion conductor compound, and as a result, the Li ion passage can be sufficiently expanded, resulting in the effect of improving lithium ion conductivity.

According to an embodiment, the element M may be substituted in a Li site in the crystal structure of the solid ion conductor compound, substituted in Zr sites, or inserted in an empty lattice points.

Since the element M has an oxidation number of 1, even when inserted in a crystal structure, and while not wanting to be bound by theory, inclusion of M does not cause severe distortion causing crystal collapse due to charge imbalance, and since the element M satisfies a particular range of ionic radius, it does not cause a crystal collapse due to excessive lattice expansion.

Accordingly, volume expansion of the crystal structure is understood to provide expanded lithium ion passages, and a solid ion conductor compound having improved lithium ion conductivity compared to a compound not having the element M substituted, can be obtained.

According to another embodiment, the element M may be present as a mixture without being substituted in Zr sites in the crystal structure of the solid ion conductor compound.

Even when the element M is present as a mixture and without being substituted in lattices in crystals of the solid ion conductor compound, the effect of increasing a crystal lattice constant remains, thus improving lithium ion conductivity from an increase in crystal volume.

In Formula 1, X is a halogen element, and for example, may be F, Cl, Br, I, or a combination thereof.

According to an embodiment, X may include Cl, Br, or a combination thereof. For example, X may be Cl. As X includes Cl, the activation energy may be decreased, thus making it possible to achieve excellent lithium ion conductivity.

According to an embodiment, X may include Cl and Br. By including Cl and Br as halogen elements, the solid ion conductor compound can have reduced activation energy, and as the proportion of an amorphous phase within the solid ion conductor compound increases, lithium ion conductivity can be further improved.

In Formula 1, the element T may be a metal element different from M, a transition metal element, a post-transition metal element, a metalloid element, or a combination thereof.

According to an embodiment, the element T may be B, Be, Mg, Ca, Sr, Se, Y, Ti, Hf, V, Nb, Ta, Cr, W, Mn, Tc, Re, Fe, Ru, Os, Co, Rh, Ir, Ni, Pd, Pt, Zn, Cd, Al, Ga, In, Ge, Sn, Pb, Sb, Bi, Po, or a combination thereof.

For example, the element T may be B, Y, Mg, Ca, Sr, Hf, Al, Ga, Bi, Sc, Sb, Ta, Nb, or a combination thereof.

In Formula 1, the following conditions may be satisfied: 1<a<3.5, 0<b<1.5, 0<c<1.5, 0<d<7, 0≤e<1, 0<b/d<0.03, and 0.05<c/d<0.18.

According to an embodiment, a may be 1.5≤a≤2.5. For example, a may be 1.6≤a≤2.4, 1.7≤a≤2.3, 1.8≤a≤2.2, 1.9≤a≤2.1, or 1.9≤a≤2.0.

According to an embodiment, b may be 0<b<0.5. For example, b may be 0<b≤0.4, 0<b≤0.3, 0<b≤0.2, or 0<b≤0.1, or 0.01<b≤0.4, 0.02<b≤0.3, 0.04<b≤0.2, or 0.05<b≤0.1.

According to an embodiment, c may be 0.1≤c≤1.5. For example, c may be 0.2≤c≤1.4, 0.3≤c≤1.3, 0.4≤c≤1.2, or 0.5≤c≤1.1.

According to an embodiment, d may be 5<d<7. For example, d may be 5.1≤d≤6.9, 5.2≤d≤6.8, 5.3≤d≤6.7, 5.4≤d≤6.6, 5.5≤d≤6.5, 5.6≤d≤6.4, 5.7≤d≤6.3, 5.8≤d≤6.2, or 5.9≤d≤6.1.

According to an embodiment, e may be 0≤e<1. For example, e may be 0≤e<0.9, 0≤e<0.8, 0≤e<0.7, 0≤e<0.6 0≤e≤0.5, 0<e<1, 0<e<0.9, 0<e<0.8, 0<e<0.7, 0<e<0.6, or 0<e≤0.5, or 0.01≤e<0.9, 0.05≤e<0.8, 0.1≤e<0.7, or 0.15≤e<0.6.

According to an embodiment, a may satisfy 1.5≤a≤2.5, b may satisfy 0<b<0.5, c may satisfy 0.1≤c<1.5, and d may satisfy 5<d<7.

According to an embodiment, b/d may satisfy 0.01≤b/d≤0.02.

According to an embodiment, c/d may satisfy 0.06≤c/d≤0.17.

According to an embodiment, a/c may satisfy 1<a/c<5. For example, 1<a/c≤4, 1<a/c≤3, 1<a/c≤2.9, 1<a/c≤2.8, 1<a/c≤2.7, 1<a/c≤2.6, 1<a/c≤2.5, 1<a/c≤2.4, 1<a/c≤2.3, 1<a/c≤2.2, 1<a/c≤2.1, or 1<a/c<2.1, or 1.1<a/c≤4, 1.2<a/c≤3, 1.5<a/c≤2.9, 1.7<a/c≤2.8, 1.9<a/c≤2.7, 2<a/c≤2.6, or 2.1<a/c≤2.5.

In Formula 1, when a, b, c, d, e, b/d, c/d, and a/c satisfy the aforementioned ranges, it is possible to improve lithium ion conductivity of the solid ion conductor compound and further to prepare a stable electrochemical cell by using the same.

According to an embodiment, the solid ion conductor compound may have at least one diffraction peak at a diffraction angle of about 15°2θ to about 17°2θ, about 30°2θ to about 32°2θ, and about 40°2θ to about 42°2θ in an XRD spectrum using CuKα radiation.

For example, the solid ion conductor compound may have a diffraction peak at a diffraction angle of 16.0°2θ±2.0°2θ, 30.4°2θ±2.0°2θ, 31.8°2θ±2.0°2θ, 34.1°2θ±2.0°2θ, 41.3°2θ±2.0°2θ, and 49.4°2θ±2.0°2θ in an XRD spectrum using CuKα radiation.

According to an embodiment, the solid ion conductor compound may have increased lattice constants in the a and c axes, compared to a compound free of a metal element M.

As will be described further hereinbelow, comparing the solid ion conductor compound according to an embodiment to a compound free of M in Formula 1 of the solid ion conductor compound, it can be confirmed that at the diffraction angle of 32.5°2θ±0.5°2θ, relative to the compound free of M in Formula 1, the diffraction peak is shifted to a diffraction angle of 31.5°2θ±0.5°2θ. Further, the diffraction peak at a diffraction angle of 31.5°2θ±0.5°2θ has an increased full-width-at-half-maximum (FWHM) compared to the diffraction peak at a diffraction angle of 32.5°2θ±0.5°2θ. These peak shifts and increase in FWHM are understood to be attributable to a crystal volume increase due to an increase in crystal lattice constant resulting from the introduction of element M.

According to an embodiment, the solid ion conductor compound may include a crystalline phase, an amorphous phase, or a combination thereof.

According to an embodiment, the solid ion conductor compound may include a first crystalline phase and a second crystalline phase, wherein the first crystalline phase and the second crystalline phase may be the same or different, and an amorphous phase may be further included between the first crystalline phase and the second crystalline phase.

The solid ion conductor compound may include at least one crystalline phase and an amorphous phase, and due to the inclusion of an amorphous phase between the crystalline phases, conductivity of lithium cations may be improved. Although uniform crystalline phases generally result in excellent lithium ion conductivity, the inclusion of an amorphous phase in which lithium ions can move freely, between the crystal phases, leads to a further improvement of lithium ion conductivity.

According to an embodiment, at least one of the crystalline phases, e.g., the first crystalline phase and the second crystalline phase, may include a layered rock-salt structure. For example, the layered rock-salt crystal structure may include a distorted layered rock-salt crystal structure.

According to an embodiment, the solid ion conductor compound may include, as a crystalline phase, a crystal structure of a C2/m space group, a crystal structure of P3m1 space group, or a combination thereof.

According to an embodiment, the solid ion conductor compound at room temperature may have, for example, an ionic conductivity of $2.4 \times 10^{-4}$ S/cm or more at $25°$ C. For example, the solid ion conductor compound at $25°$ C. may have an ionic conductivity of $2.5 \times 10^{-4}$ S/cm or more, $3.0 \times 10^{-4}$ S/cm or more, $3.5 \times 10^{-4}$ S/cm or more, $4.0 \times 10^{-4}$ S/cm or more, $4.1 \times 10^{-4}$ S/cm or more, $4.2 \times 10^{-4}$ S/cm or more, $4.3 \times 10^{-4}$ S/cm or more, and $4.4 \times 10^{-4}$ S/cm or more.

According to an embodiment, the solid ion conductor compound may be $Li_a Na_b Zr_c Cl_d T_e$ (wherein $1 < a < 3.5$, $0 < b < 1.5$, $0 < c < 1.5$, $0 < d < 7$, $0 \le e < 1$), $Li_a K_b Zr_c Cl_d T_e$ (wherein $1 < a < 3.5$, $0 < b < 1.5$, $0 < c < 1.5$, $0 < d < 7$, $0 \le e < 1$), $Li_a Rb_b Zr_c Cl_d T_e$ (wherein $1 < a < 3.5$, $0 < b < 1.5$, $0 < c < 1.5$, $0 < d < 7$, $0 \le e < 1$), $Li_a Mo_b Zr_c Cl_d T_e$ (wherein $1 < a < 3.5$, $0 < b < 1.5$, $0 < c < 1.5$, $0 < d < 7$, $0 \le e < 1$), $Li_a Cu_b Zr_c Cl_d T_e$ (wherein $1 < a < 3.5$, $0 < b < 1.5$, $0 < c < 1.5$, $0 < d < 7$, $0 \le e < 1$), $Li_a Hg_b Zr_c Cl_d T_e$ (wherein $1 < a < 3.5$, $0 < b < 1.5$, $0 < c < 1.5$, $0 < d < 7$, $0 \le e < 1$), $Li_a Ag_b Zr_c Cl_d T_e$ (wherein $1 < a < 3.5$, $0 < b < 1.5$, $0 < c < 1.5$, $0 < d < 7$, $0 \le e < 1$), $Li_a Au_b Zr_c Cl_d T_e$ (wherein $1 < a < 3.5$, $0 < b < 1.5$, $0 < c < 1.5$, $0 < d < 7$, $0 \le e < 1$), or $Li_a Tl_b Zr_c Cl_d T_e$ (wherein $1 < a < 3.5$, $0 < b < 1.5$, $0 < c < 1.5$, $0 < d < 7$, $0 \le e < 1$). In an aspect, in Formula 1 T may be Y.

For example, the solid ion conductor compound may be $Li_{1.96}Na_{0.03}ZrCl_6$, $Li_{1.96}Na_{0.04}ZrCl_6$, $Li_{1.9}Na_{0.1}ZrCl_6$, $Li_2Na_{0.04}Zr_{0.99}Cl_6$, $Li_2Na_{0.1}Zr_{0.98}Cl_6$, $Li_{1.96}Cu_{0.04}ZrCl_6$, $Li_2Cu_{0.04}Zr_{0.99}Cl_6$, $Li_{1.96}Ag_{0.04}ZrCl_6$, $Li_{1.96}K_{0.04}ZrCl_6$, $Li_{1.96}Na_{0.04}Y_{0.5}Zr_{0.5}Cl_6$, $Li_{1.9}K_{0.1}ZrCl_6$, $Li_{1.85}K_{0.15}ZrCl_6$, $Li_{2.36}Na_{0.04}Zr_{0.9}Cl_6$, or $Li_{2.45}Na_{0.05}Zr_{0.5}Cl_6Y_{0.5}$. A combination comprising at least one of the forgoing may be used.

Preparation Method for Solid Ion Conductor Compound

According to an aspect, a method of preparing a solid ion conductor compound includes: providing a mixture by mixing a zirconium precursor compound, a lithium precursor compound, and a metal M precursor compound; and treating the mixture to form the solid ion conductor compound. The treating may be solid state method, such as ball milling. The solid ion conductor compound is a solid ion conductor compound that is described above.

The lithium precursor compound may include a lithium halide. For example, the lithium halide may include LiF, LiCl, LiBr, LiI, or a combination thereof. For example, the lithium halogenide may include LiCl, LiBr, or a combination thereof.

The zirconium precursor compound may include a zirconium halide. For example, the zirconium halide may include $ZrF_4$, $ZrCl_4$. $ZrBr_4$, $ZrI_4$, or a combination thereof. For example, the zirconium halide may include $ZrCl_4$, $ZrBr_4$, or a combination thereof.

The M precursor compound may include a halide of Na, K, Rb, Mo(I), Cu(I), Hg, Ag, Au, Tl, or a combination thereof. For example, the M precursor compound may include NaCl, KCl, RbCl, CuCl, HgCl, AgCl, AuCl, TlCl, NaBr, KBr, RbBr, CuBr, HgBr, AgBr, AuBr, TlBr, or a combination thereof. For example, the M precursor compound may include NaCl, KCl, CuCl, AgCl, or a combination thereof.

According to an embodiment, the lithium halide and the zirconium halide may be mixed in a stoichiometric ratio of about 1:1 to about 5:1. For example, the stoichiometric ratio of the lithium halide and the zirconium halide may be about 1:1 to about 4.5:1, about 1:1 to about 4:1, about 1:1 to about 3.5:1, about 1:1 to about 3:1, about 1.1:1 to about 2.9:1, about 1.2:1 to about 2.8:1, about 1.3:1 to about 2.7:1, about 1.4:1 to about 2.6:1, about 1.5:1 to about 2.5:1, about 1.6:1 to about 2.4:1, about 1.7:1 to about 2.3:1, about 1.8:1 to about 2.2:1, or about 1.9:1 to about 2.1:1, but is not limited thereto.

According to an embodiment, the M precursor compound and the zirconium halide may be mixed in a stoichiometric ratio of about 0.01:1 to about 1:1. For example, the M precursor compound and the zirconium halide may be mixed in a stoichiometric ratio of about 0.01:1 to about 0.5:1, or about 0.01:1 to about 0.3:1, but is not limited thereto.

According to an embodiment, the mixture may further include a T precursor compound. Element T in the T precursor compound may be a halide of a metal element different from M, a transition metal element, or a post-transition metal element. For example, the T precursor compound may be a halide of Y, Mg, Ca, Sr, Hf, Al, Ga, Bi, Sc, Sb, Ta, or Nb. Examples of the T precursor compound may include $YCl_3$, $YBr_3$, $MgCl_2$, $MgBr_2$, $CaCl_2$, or $CaBr_2$.

According to an embodiment, the production of a solid ion conductor compound by reacting the above mixture in a solid state may include ball-milling the above mixture at 500 rpm for 48 hours under a dry inert atmosphere, such as in Ar.

According to an embodiment, the ball-milling may be conducted for a first duration and then have a rest period for a second duration. Here, the first duration and the second duration may be identical, or different from each other. For example, the first duration may be a duration twice or more the second duration, for example, a duration three times longer the second duration. As such, by including a rest period in the ball-milling process, the solid ion conductor compound may be obtained as a mixture in a crystalline phase and an amorphous phase.

According to an embodiment, the preparation method of the solid ion conductor compound is conducted at room temperature and does not include a calcination process for crystallization. For example, the preparation method of the solid ion conductor compound may be conducted at room temperature ($25°$ C.).

Unlike methods of preparing a solid ion conductor compound that include the process of crystallization by a heat-treatment a starting material mixture, in the disclosed preparation method of the solid ion conductor compound a separate crystallization process after a solid-state mixing process may be omitted, and thus can yield a solid ion conductor compound that contains Zr and M metal, has a crystalline phase and an amorphous phase, and has an advantage that the lithium ion conductivity also increases as the crystalline phase increases in volume.

The inert atmosphere is an atmosphere containing an inert gas. The inert gas is, for example, nitrogen, argon, or He, but is not necessarily limited thereto, and may be any suitable gas that is used as an inert gas in the relevant technical field.

Electrochemical Cell

An electrochemical cell according to another example may include: a cathode layer containing a cathode active material layer; an anode layer containing an anode active material layer; and a solid electrolyte layer positioned between the cathode layer and the anode layer, wherein at least one of the cathode layer and the solid electrolyte layer may include the above-described solid ion conductor compound. As the electrochemical cell includes the solid ion conductor compound, lithium ion conductivity and chemical stability of the electrochemical cell can be improved.

The electrochemical cell may be, for example, an all-solid-state secondary battery, a secondary battery containing a liquid electrolyte, or a lithium-air battery, but is not limited thereto and may be any electrochemical cell that is used in the relevant technical field.

Hereinbelow, the all-solid-state secondary battery will be further described, as an example.

All-Solid Secondary Battery: Type 1

The above-described solid ion conductor compound may be included.

The all-solid-state secondary battery may include, for example: a cathode layer including a cathode active material layer; an anode layer including an anode active material layer; and a solid electrolyte layer positioned between the cathode layer and the anode layer, wherein at least one of the cathode active material layer and the solid electrolyte layer may include the above-described solid ion conductor compound.

The all-solid-state secondary battery according to an embodiment may be prepared as follows.

Solid Electrolyte Layer

First, a solid electrolyte layer is prepared.

The solid electrolyte layer may be prepared by mixing and drying the above-described solid ion conductor compound and a binder, or by pressing the powder of the solid ion conductor compound represented by Formula 1 into a certain shape with a pressure of about 1 ton to about 10 tons. The above-described solid ion conductor compound is used as a solid electrolyte.

The solid electrolyte may have an average particle diameter of about 0.5 micrometers ($\mu$m) to about 20 $\mu$m. As the solid electrolyte has an average particle diameter in the above range, ionic conductivity and lifetime characteristics of solid electrolyte particles may be improved as bonding during the formation of a sintered body increases.

The solid electrolyte layer may have a thickness of about 10 $\mu$m to about 200 $\mu$m. As the solid electrolyte layer has a thickness in the above range, a sufficient movement speed of lithium ions can be secured, and as a result, a high ionic conductivity can be achieved.

The solid electrolyte layer may further include, in addition to the above-described solid ion conductor compound, a solid electrolyte such as a sulfide-based solid electrolyte or oxide-based solid electrolyte, or a combination thereof.

The sulfide-based solid electrolyte may include, for example, lithium sulfide, silicon sulfide, boron sulfide, or a combination thereof. The sulfide-based solid electrolyte particles may include $Li_2S$, $P_2S_5$, $SiS_2$, $GeS_2$, $B_2S_3$, or a combination thereof. The sulfide-based solid electrolyte particles may be $Li_2S$ or $P_2S_5$. The sulfide-based solid electrolyte particles are known to have a higher lithium ion conductivity than other inorganic compounds. For example, the sulfide-based solid electrolyte may include $Li_2S$ and $P_2S_5$. If a sulfide solid electrolyte material forming the sulfide-based solid electrolyte includes $Li_2S$—$P_2S_5$, the molar ratio of $Li_2S$ to $P_2S_5$ may be, for example, in a range of about 50:50 to about 90:10, based on a total content of $Li_2S$ and $P_2S_5$. In addition, materials that may be used as the sulfide solid electrolyte include an inorganic solid electrolyte prepared by adding $Li_3PO_4$, a halogen, a halogen compound, $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("ThioLISICON"), $Li_2O$—$Al_2O_3$—$TiO_2$—$P_2O_5$ ("LATP"), $Li_2S$—$P_2S_5$, $SiS_2$, $GeS_2$, or $B_2S_3$, to $Li_2S$—$P_2S_5$, $SiS_2$, $GeS_2$, $B_2S_3$, or an inorganic solid electrolyte comprising a combination thereof. Examples of the sulfide solid electrolyte material include, but are not limited to, $Li_2S$—$P_2S_5$; $Li_2S$—$P_2S_5$—LiX (X is a halogen element); $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$—$Z_mS_n$ (m and n are positive numbers, and Z is Ge, Zn, or G); $Li_2S$—$GeS_2$; $Li_2S$—$SiS_2$—$Li_3PO_4$; and $Li_{2S}$—$SiS_2$-$Li_pMO_q$(wherein p and q are positive numbers, and M is P, Si, Ge, B, Al, Ga, or In). In this context, the sulfide-based solid electrolyte material may be prepared by treating the starting materials of a sulfide-based solid electrolyte material (e.g., $Li_2S$ and $P_2S_5$) by a melt quenching method, or a mechanical milling method. In addition, a calcination process may be conducted after the above treatment.

Examples of a binder included in the solid electrolyte layer include, but are not limited to, styrene butadiene rubber (SBR), polytetrafluoroethylene, polyvinylidene fluoride, polyethylene, polyvinyl alcohol, or a combination thereof and may be any suitable material that is used as a binder in the relevant technical field. The binder in the solid electrolyte layer may be the same as, or different from, a binder in the cathode layer and the anode layer.

Cathode Layer

Next, a cathode layer is prepared.

The cathode layer may be prepared by forming a cathode active material layer containing a cathode active material on a current collector. The cathode active material may have an average particle diameter of about 2 $\mu$m to about 10 $\mu$m.

Any material that is suitable for a secondary battery may be used for the cathode active material without limitations. For example, the cathode active material may be a lithium transition metal oxide, or a transition metal sulfide. For example, a composite oxides of lithium with a metal, wherein the metal is cobalt, manganese, nickel, or a combination thereof, may be used. Specific examples of such composite oxides include: $Li_aA_{1-b}B^1_bD^1_2$ (in the formula, $0.90 \leq a \leq 1.8$, and $0 \leq b \leq 0.5$); $Li_aE_{1-b}B^1_bO_{2-c}D^1_c$ (in the formula, $0.90 \leq a \leq 1.8$, $0 \leq b \leq 0.5$, and $0 \leq c \leq 0.05$); $LiE_{2-b}B^1_bO_{4-c}D^1_c$ (in the formula, $0 \leq b \leq 0.5$ and $0 \leq c \leq 0.05$); $Li_a Ni_{1-b-c}CO_bB^1_cD^1_\alpha$ (in the formula, $0.90 \leq a \leq 1.8$, $0 \leq b \leq 0.5$, $0 \leq c \leq 0.05$, and $0 < \alpha \leq 2$); $Li_aNi_{1-b-c}Co_bB^1_cO_{2-\alpha}F^1_\alpha$ (in the formula, $0.90 \leq a \leq 1.8$, $0 \leq b \leq 0.5$, $0 \leq c \leq 0.05$, and $0 < \alpha < 2$); $Li_aNi_{1-b-c}Co_bB^1_cO_{2-\alpha}F^1_\alpha$ (in the formula, $0.90 \leq a \leq 1.8$, $0 \leq b \leq 0.5$, $0 \leq c \leq 0.05$, $0 < \alpha < 2$); $Li_aNi_{1-b-c}Mn_bB^1_cD^1_\alpha$ (in the formula, $0.90 \leq a \leq 1.8$, $0 \leq b \leq 0.5$, $0 \leq c \leq 0.05$, $0 < \alpha \leq 2$); $Li_a Ni_{1-b-c}Mn_bB^1_cO_{2-\alpha}F^1_\alpha$ (in the formula, $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_2$ (in the formula, $0.90 \leq a \leq 1.8$, $0 \leq b \leq 0.5$, $0 \leq c \leq 0.05$, and $0 < \alpha < 2$); $Li_a Ni_b E_c G_d O_2$ (in the formula, $0.90 \leq a \leq 1.8$, $0 \leq b \leq 0.9$, $0 \leq c \leq 0.5$, and $0.001 \leq d \leq 0.1$); $Li_a Ni_b Co_c Mn_d GeO_2$ (in the formula, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_a NiG_b O_2$ (in the formula, $0.90 \leq a \leq 1.8$, and $0.001 \leq b \leq 0.1$); $Li_a CoG_b O_2$ (in the formula, $0.90 \leq a \leq 1.8$, and $0.001 \leq b \leq 0.1$); $Li_a MnG_b O_2$ (in the formula, $0.90 \leq a \leq 1.8$, and $0.001 \leq b \leq 0.1$); $Li_a Mn_2 GbO_4$ (in the formula, $0.90 \leq a \leq 1.8$, and $0.001 \leq b \leq 0.1$); $QO_2$; $QS_2$; $LiQS_2$; $V_2 O_5$; $LiV_2 O_2$; $LiI'O_2$; $LiNiVO_4$; $Li_{(3-f)} J_2 (PO_4)_3$ ($0 \leq f \leq 2$); $Li_{(3-f)} Fe_2 (PO_4)_3$ ($0 \leq f \leq 2$); and $LiFePO_4$. In the above formulas, A is Ni, Co, Mn, or a combination thereof; $B^1$ is Al, Ni, Co, Mn, Cr, Fe, Mg, Sr, V, a rare-earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. Examples include $LiCoO_2$, $LiMn_x O_{2x}$ (x=1, 2), $LiNi_{1-x} Mn_x O_{2x}$ ($0 < x < 1$), $Ni_{1-x-y} Co_x Mn_y O_2$ ($0 \leq x \leq 0.5$, $0 \leq y \leq 0.5$), $Ni_{1-x-y} Co_x Al_y O_2$ ($0 \leq x \leq 0.5$, $0 \leq y \leq 0.5$), $LiFePO_4$, $TiS_2$, $FeS_2$, $TiS_3$, and $FeS_3$.

A composition having a coating layer on a surface of the above compound may also be used, and a mixture of the above compound and a composition having a coating layer added thereon may also be used. The coating layer added on the surface of the above compound may include, for example, a coating element, such as an oxide or hydroxide of the coating element, oxyhydroxide of the coating element, oxycarbonate of the coating element, or a hydroxycarbonate of the coating element. Compounds forming the above coating layer may be amorphous or crystalline. The coating element included in the coating layer may be Mg, Al, Co, K, Na, Ca, Si, Ti, V, Sn, Ge, Ga, B, As, Zr, or a mixture thereof. The method by which the coating layer is formed, is selected from among methods that do not adversely affect the physical properties of a cathode active material. The coating method may be, for example, a spray coating method, a dipping method, or a combination thereof. Such particular coating methods are well known to those of ordinary skill in the relevant field and thus, will not be described in further detail.

The cathode active material may include, for example, a lithium salt of at least one of the above-described transition metal oxides that has a layered rock-salt type structure. The "layered rock-salt type structure" is for example, a cubic rock-salt type structure where an oxygen atom layer and a metal atom layer are alternatingly regularly arranged in the <111> direction, and as a result, each atomic layer forms a two-dimensional plane. The "cubic rock-salt type" represents a NaCl type structure, which is one type of lattice structure, and specifically represents a structure in which the face centered cubic lattice (FCC) formed by each cation and anion are obliquely positioned by ½ of the ridge of the unit lattice. The lithium transition metal oxide having such a layered rock-salt type structure may be, for example, a tertiary lithium transition metal oxide, such as $LiNi_x Co_{y^-} Al_z O_2$ (NCA) ($0 < x < 1$, $0 < y < 1$, $0 < z < 1$, and x+y+z=1) or $LiNi_{x'} Co_{y'} Mn_{z'} O_2$ (NCM) ($0 < x' < 1$, $0 < y' < 1$, $0 < z' < 1$, and x'+y'+z'=1). When the cathode active material includes a tertiary lithium transition metal oxide having a layered rock-salt type structure, the energy density and thermal stability of an all-solid secondary battery may be further improved.

According to an embodiment, the cathode layer may include a cathode active material represented by $LiNi_x Co_{y^-}$ $Al_z O_2$ or $LiNi_x Co_y Mn_z O_2$, wherein $0 < x < 1$, $0 < y < 1$, $0 < z < 1$, x+y+z=1, $0 < x' < 1$, $0 < y' < 1$, $0 < z' < 1$, and x'+y'+z'=1, and a portion or all of a surface of the cathode active material may be coated with a lithium ion-conductor compound. For example, the lithium ion-conductor compound may be a $Li_2 ZrO_3$.

The cathode active material may be coated with any suitable material that is known as a coating layer material for a cathode active material. For example, a coating layer of the cathode active material may be $Li_2 O$—$ZrO_2$ (LZO).

The cathode active material, if including nickel (Ni) as a tertiary lithium transition metal oxide, such as NCA or NCM, may increase a capacity density of an all-solid-state secondary battery and thus can decrease the elution of metal from a cathode active material in a charged state. As a result, the cycle characteristics of the all-solid-state secondary battery in a charged state may be improved.

The form of the cathode active material may be, for example, particles, and the particles may be spherical, oval, or a combination thereof. A particle diameter of the cathode active material is not particularly limited and is within a range that is applicable to cathode active materials in all-solid-state secondary batteries in the related art. The amount of the cathode active material also is not particularly limited and is within a range that is applicable to cathode layers in all-solid-state secondary batteries in the related art. The amount of the cathode active material in the cathode active material layer may be, for example, about 50 weight percent (wt %) to about 95 wt %, based on a total weight of the cathode active material layer.

The cathode active material layer may further include the above-described solid ion conductor compound.

The cathode active material layer may include a binder. The binder may be, for example, styrene butadiene rubber (SBR), polytetrafluoroethylene, polyvinylidene fluoride, polyethylene, or a combination thereof.

The cathode active material layer may include a conductive material. Examples of the conductive material include graphite, carbon black, acetylene black, Ketjen black, carbon fibers, metal powder, or a combination thereof.

In addition to the cathode active material, the solid electrolyte, the binder, and the conductive material described above, the cathode active material layer may further include an additive, such as a filler, a coating agent, a dispersing agent, an ionic conductivity aid, or a combination thereof.

For fillers, coating agents, dispersing agents, ionic conductivity aids, and the like that may be included in the cathode active material layer, any suitable material that is being used in electrodes of all-solid-state secondary batteries may be used.

For the cathode current collector, a plate or a foil formed of aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof, may be used. The cathode current collector may be absent.

The cathode current collector may further include a carbon layer positioned on one side or both sides of a metal substrate. As the carbon layer is further positioned on the metal substrate, it is possible to prevent corrosion of the metal of the metal substrate caused by a solid electrolyte included in a cathode layer, and to reduce interfacial resistance between the cathode active material layer and the cathode current collector.

A thickness of the carbon layer may be, for example, about 1 μm to about 5 μm. If the thickness of the carbon layer is excessively small, it may be difficult to completely prevent the contact between the metal substrate and the solid electrolyte. If the thickness of the carbon layer is excessively large, energy density of all-solid-state secondary batteries may be reduced. The carbon layer may include an amorphous carbon, a crystalline carbon, or a combination thereof.

Anode Layer

Next, an anode layer is prepared.

The anode layer may be prepared in the same manner as a cathode layer, except that an anode active material is used instead of a cathode active material. The anode layer may be prepared by forming an anode active material layer containing an anode active material on an anode current collector.

The anode active material layer may further include the above-described solid ion conductor compound.

The anode active material may comprise lithium metal, a lithium metal alloy, or a combination thereof.

The anode active material layer may further include an anode active material in addition to lithium metal, a lithium metal alloy, or a combination thereof. For example, the anode active material may include lithium metal, a metal that can be alloyed with lithium, a transition metal oxide, a non-transition metal oxide, a carbon-based material, or a combination thereof. Examples of the metal that can be alloyed with lithium may include Ag, Si, Sn, Al, Ge, Pb, Bi, Sb Si—Y' alloys (where, Y' is an alkali metal, an alkaline earth metal, a Group 13 element, a Group 14 element, a transition metal, a rare-earth element, or a combination of the aforementioned elements, and is not Si), an Sn-X'Y' alloy (where, Y' is an alkali metal, an alkaline earth metal, an element in Group 13, an element in Group 14, a transition metal, a rare-earth element, or a combination of the aforementioned elements, and is not Sn), and the like. Element Y' may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxide may be, for example, a lithium titanium oxide, a vanadium oxide, a lithium vanadium oxide, or a combination thereof. The non-transition metal oxide may be, for example, $SnO_2$, $SiO_x$ ($0<x<2$), or a combination thereof. The carbon-based material may be, for example, a crystalline carbon, an amorphous carbon, or a combination thereof. Examples of the crystalline carbon may include graphite, artificial graphite, natural graphite, or a combination thereof. The carbon may have any suitable shape, and may have a plate, flake, spherical, or fiber form. Examples of the amorphous carbon may include soft carbon (low-temperature calcined carbon) or hard carbon, mesophase pitch carbides, or calcined coke, or a combination thereof.

Figure 7:
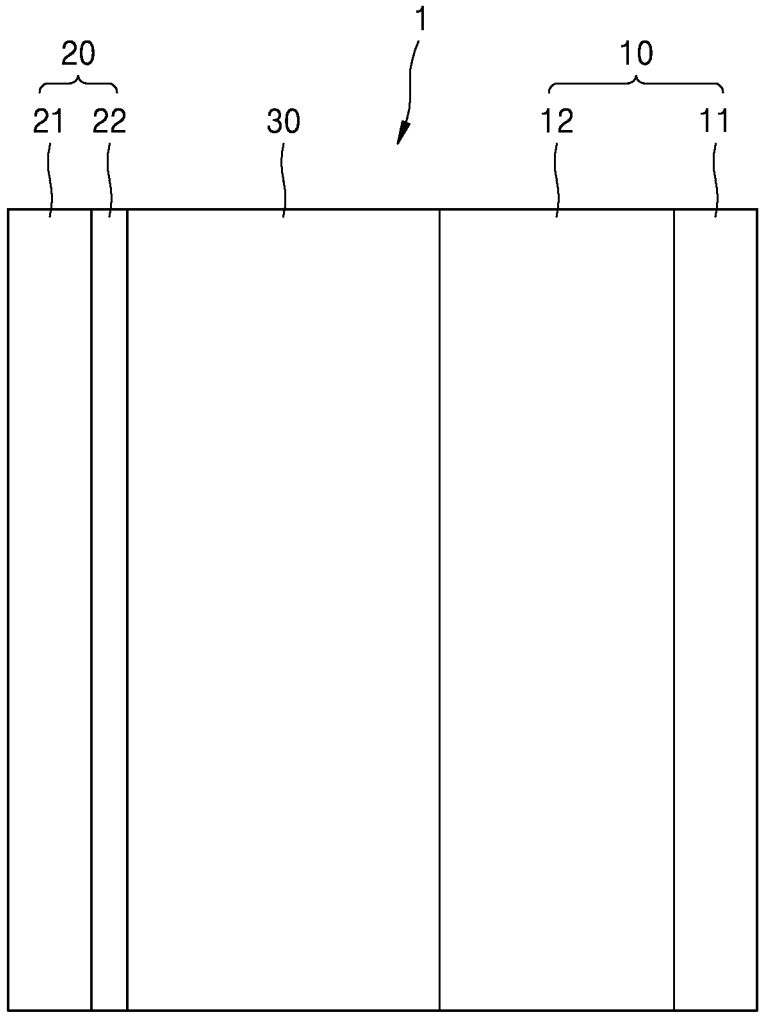
FIG. 7 is a schematic diagram of an all-solid-state secondary battery according to an embodiment.

Referring to FIG. 7, an all-solid-state secondary battery 1 according to an embodiment includes a solid electrolyte layer 30, a cathode layer 10 positioned on one side of the solid electrolyte layer 30, and an anode layer 20 positioned on the other side of the solid electrolyte layer 30. The cathode layer 10 includes a cathode active material layer 12 in contact with the solid electrolyte layer 30, and a cathode current collector 11 in contact with the cathode active material layer 12, and the anode layer 20 includes an anode active material layer 22 in contact with the solid electrolyte layer 30, and an anode current collector 21 in contact with the anode active material layer 22. The all-solid-state secondary battery 1 may be formed, for example, by forming the cathode active material layer 12 and the anode active material layer 22 on both sides of the solid electrolyte layer 30, and forming the cathode current collector 11 and the anode current collector 21 on the cathode active material layer 12 and the anode active material layer 22, respectively. Alternatively, the all-solid-state secondary battery 1 may be formed by, for example, sequentially stacking the anode active material layer 22, the solid electrolyte layer 30, the cathode active material layer 12, and the cathode current collector 11 on an anode current collector 21.

All-Solid Secondary Battery: Type 2

Figure 8:
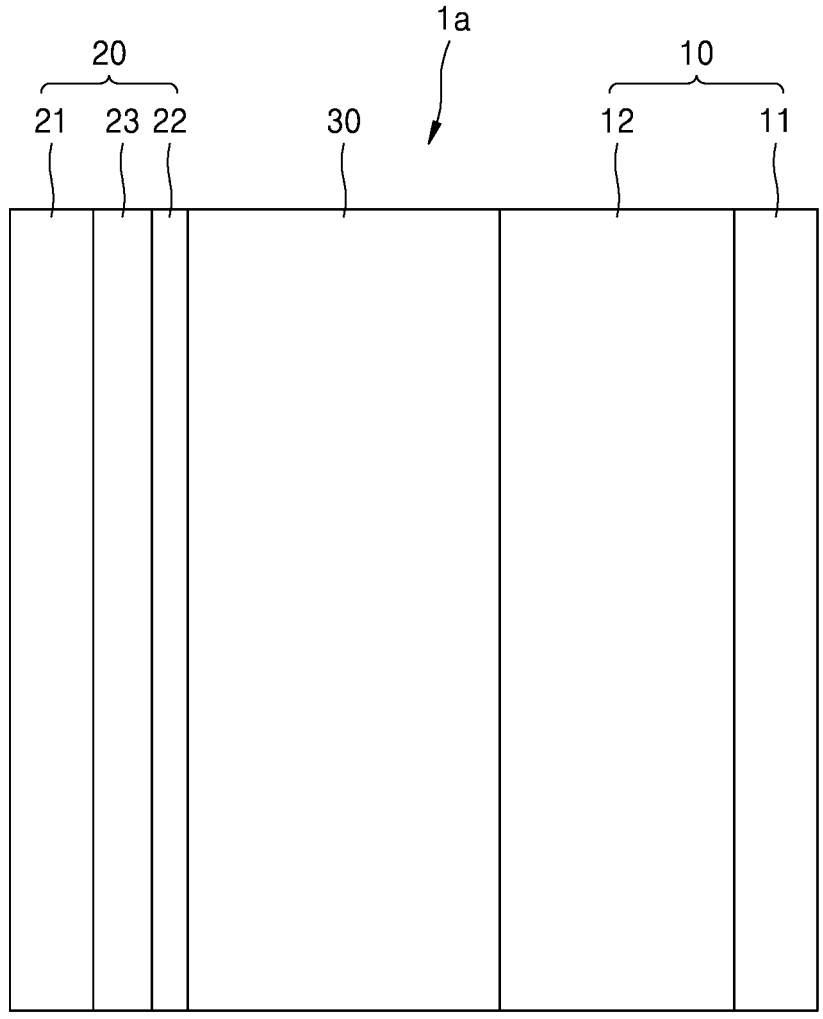
FIG. 8 is a schematic diagram of an all-solid-state secondary battery according to an embodiment.

Referring to FIGS. 7 and 8, an all-solid-state secondary battery 1 or 1a may include, for example: a cathode layer 10 including a cathode active material layer 12 positioned on a cathode current collector 11; an anode layer 20 including an anode active material layer 22 positioned on an anode current collector 21; and an electrolyte layer 30 positioned between the cathode layer 10 and the anode layer 20, wherein the cathode active material layer 12 and/or the solid electrolyte layer 30 may include the solid ion conductor compound.

An all-solid-state secondary battery according to another embodiment may be prepared as follows.

A cathode layer and a solid electrolyte layer are prepared in the same manner as the all-solid-state secondary battery described above.

Anode Layer

Next, an anode layer is prepared.

Referring to FIGS. 7 and 8, the anode layer 20 includes the anode current collector 21 and the anode active material layer 22 positioned on the anode current collector 21, and the anode active material layer 22 includes, for example, an anode active material and a binder.

The anode active material included in the anode active material layer 22 has a particle form, for example. The average particle diameter of the anode active material having a particle form may be, for example, 4 μm or less, 3 μm or less, 2 μm or less, 1 μm or less, or 900 nanometers (nm) or less. The average particle diameter of the anode active material having a particle form may be, for example, about 10 nm to about 4 μm or less, about 10 nm to about 3 μm or less, about 10 nm to about 2 μm or less, about 10 nm to about 1 μm or less, or about 10 nm to about 900 nm or less. As the anode active material has an average particle diameter in the above ranges, reversible absorbing and/or desorbing of lithium during charge and discharge may be facilitated. The average particle diameter of the anode active material may be a median particle diameter (D50) measured using a laser particle size distribution system.

The anode active material included in the anode active material layer 22 may include, for example, a carbon-based anode active material, a metal, or metalloid anode active material.

The carbon-based anode active material may comprise an amorphous carbon, in particular. Examples of the amorphous carbon include, but are not necessarily limited to, carbon black (CB), acetylene black (AB), furnace black (FB), Ketjen black (KB), graphene, or a combination thereof, and may be any suitable material that is classified as amorphous carbon in the relevant technical field. The amorphous carbon is carbon that has no crystallinity or extremely low crystallinity, and as such is distinguished from crystalline carbon or graphite-based carbon.

The metal or metalloid anode active material includes, but is not necessarily limited to, gold (Au), platinum (Pt), palladium (Pd), silicon (Si), silver (Ag), aluminum (Al), bismuth (Bi), tin (Sn), or zinc (Zn), and may be any suitable material that is used in the relevant technical field as a metalloid anode active material or a metal anode active material that forms a compound or an alloy with lithium. For example, nickel (Ni) does not form an alloy with lithium and is thus not a metal anode active material.

The anode active material layer 22 includes one type of anode active material from among such anode active materials, or a mixture of multiple different anode active materials. For example, the anode active material layer 22 may include only amorphous carbon, or include gold (Au), platinum (Pt), palladium (Pd), silicon (Si), silver (Ag), aluminum (Al), bismuth (Bi), tin (Sn), zinc (Zn), or a combination thereof. For example, the anode active material layer 22 includes a mixture of amorphous carbon and gold (Au), platinum (Pt), palladium (Pd), silicon (Si), silver (Ag), aluminum (Al), bismuth (Bi), tin (Sn), zinc (Zn), or a combination thereof. A mixing ratio of the mixture of amorphous carbon and the gold (Au), platinum (Pt), palladium (Pd), silicon (Si), silver (Ag), aluminum (Al), bismuth (Bi), tin (Sn), zinc (Zn), or a combination thereof may be, for example, 10:1 to 1:2, 5:1 to 1:1, or 4:1 to 2:1, but is not necessarily limited to the aforementioned ranges, and is selected in accordance with features of an all-solid-state secondary battery 1. As the anode active material has such a composition, cycle characteristics of the all-solid-state secondary battery 1 can be further improved.

The anode active material included in the anode active material layer 22 may include a mixture of first particles formed of amorphous carbon, and second particles formed of a metal or a metalloid. Examples of the metal or metalloid include gold (Au), platinum (Pt), palladium (Pd), silicon (Si), silver (Ag), aluminum (Al), bismuth (Bi), tin (Sn), zinc (Zn), or a combination thereof. The metalloid alternatively is a semiconductor. The amount of the second particles may be about 8 wt % to about 60 wt %, about 10 wt % to about 50 wt %, about 15 wt % to about 40 wt %, or about 20 wt % to about 30 wt %, based on a total weight of the anode active material. As the amount of the second particles is within the aforementioned ranges, for example, cycle characteristics of the all-solid-state secondary battery 1 can be further improved.

Examples of a binder included in the anode active material layer 22 include, but are not necessarily limited to, styrene-butadiene rubber (SBR), polytetrafluoroethylene, polyvinylidene fluoride, polyethylene, a vinylidene fluoride/hexafluoropropylene copolymer, polyacrylonitrile, polymethyl methacrylate, or a combination thereof, and may be any suitable material that is used as a binder in the relevant technical field. The binder may include a single binder or multiple different binders.

As the anode active material layer 22 includes a binder, the anode active material layer 22 is stabilized on the anode current collector 21. Also, the anode active material layer 22 is suppressed from cracking even in the face of volume changes and/or changes in the relative position of the anode active material layer 22 during the charging/discharging process. For example, when the anode active material layer 22 does not include a binder, the anode active material layer 22 can be easily separated from the anode current collector 21. The likelihood of short-circuits increases as the anode current collector 21 contacts the solid electrolyte layer 30 at a portion of the anode current collector 21 exposed as the anode active material layer 22 is separated from the anode current collector 21. The anode active material layer 22 may be formed by, for example, coating and drying on the anode current collector 21 a slurry in which the anode active material is dispersed. By including a binder in the anode active material layer 22, a stable dispersion of the anode active material within the slurry is made possible. For example, in a case in which the slurry is coated on the anode current collector 21 by a screen-printing method, it is possible to suppress the blockage of the screen (for example, blockage due to aggregates of the anode active material).

The anode active material layer 22 may further include an additive, used in an all-solid-state secondary battery in the related art, and the additive may be a filler, a coating agent, a dispersing agent, an ionic conductivity aid, or a combination thereof.

A thickness of the anode active material layer 22 may be, for example, 50% or less, 40% or less, 30% or less, 20% or less, 10% or less, or 5% or less, of a thickness of the cathode active material layer 12. The thickness of the anode active material layer 22 may be, for example, about 1 μm to about 20 μm, about 2 μm to about 10 μm, or about 3 μm to about 7 μm. If the thickness of the anode active material layer 22 is excessively small, lithium dendrites formed between the anode active material layer 22 and the anode current collector 21 may disintegrate the anode active material layer 22, thus making it difficult to improve the cycle characteristics of the all-solid-state secondary battery 1. If the thickness of the anode active material layer 22 excessively increases, the energy density of the all-solid-state secondary battery 1 decreases, and as the internal resistance of the all-solid-state secondary battery 1 from the anode active material layer 22 increases, it is difficult to improve the cycle characteristics of the all-solid-state secondary battery 1.

If the thickness of the anode active material layer 22 decreases, for example, the charge capacity of the anode active material layer 22 decreases. The charge capacity of the anode active material layer 22 may be, for example, 50% or less, 40% or less, 30% or less, 20% or less, 10% or less, or 5% or less, or 2% or less, of the charge capacity of the cathode active material layer 12. The charge capacity of the anode active material layer 22 may be, for example, about 0.1% to about 50%, about 0.1% to about 40%, about 0.1% to about 30%, about 0.1% to about 20%, about 0.1% to about 10%, about 0.1% to about 5%, or about 0.1% to about 2%, or about 0.2% to about 50%, about 0.4% to about 40%, or about 0.5% to about 30%, with respect to the charge capacity of the cathode active material layer 12. If the charge capacity of the anode active material layer 22 is too small, the thickness of the anode active material layer 22 becomes extremely small, and thus, during repeated charge-discharge processes, lithium dendrites formed between the anode active material layer 22 and the anode current collector 21 may disintegrate the anode active material layer (22, thus making it difficult to improve the cycle characteristics of the all-solid-state secondary battery 1. If the charge capacity of the anode active material layer 22 excessively increases, the energy density of the all-solid-state secondary battery 1 decreases, and as the internal resistance of the all-solid-state secondary battery 1 from the anode active material layer 22 increases, it is difficult to improve the cycle characteristics of the all-solid-state secondary battery 1.

The charge capacity of the cathode active material layer 12 may be obtained by multiplying a charge specific capacity (mAh/g) of a cathode active material, by the mass of the cathode active material in the cathode active material layer 12. In a case in which the cathode active material used includes different types of cathode active materials, the charge capacity can be based on the relative content of each cathode active material. Thus a value of charge specific capacity x mass for each cathode active material, and the total sum of these values is regarded as a charge capacity of the cathode active material layer 12. The charge capacity of the anode active material layer 22 is calculated by the same method. The charge capacity of the anode active material layer 22 is obtained by multiplying a charge specific capacity (mAh/g) of an anode active material by the mass of an anode active material in the anode active material layer 22. In a case in which the anode active material used includes different types of anode active materials, the charge capacity can be based on the relative content of each anode active material. Thus a value of charge specific capacity x mass for each anode active material, and the total sum of these values is regarded as a charge capacity of the anode active material layer 22. Here, the charge specific capacity of the cathode active material and the anode active material are estimated using an all-solid-state half-cell using lithium metal as a counter electrode. The charge capacities of the cathode active material layer 12 and the anode active material layer 22 are directly measured by a charge capacity measurement using the half-cell. A charge capacity density is obtained by dividing the measured charge capacity by the mass of the respective active materials. Alternatively, the charge capacities of the cathode active material layer 12 and the anode active material layer 22 may be initial charge capacities measured during the first charging cycle.

Referring to FIG. 8, an all-solid-state secondary battery 1*a* may further include, for example, a metal layer 23 disposed between the anode current collector 21 and the metal layer 23. The metal layer 23 includes lithium or a lithium alloy. Accordingly, the metal layer 23 acts as a lithium reservoir, for example. Examples of the lithium alloy include, but are not limited to, a Li—Al alloy, Li—Sn alloy, Li—In alloy, Li—Ag alloy, Li—Au alloy, Li—Zn alloy, Li—Ge alloy, Li—Si alloy, or a combination thereof, and may be any suitable material that is used as a lithium alloy in the relevant technical field. The metal layer 23 may be formed of one of the aforementioned alloys, or lithium, or may be formed of alloys of various kinds.

A thickness of the metal layer 23 is not particularly limited, and may be, for example, about 1 μm to about 1000 μm, about 1 μm to about 500 μm, about 1 μm to about 200 μm, about 1 μm to about 150 μm, about 1 μm to about 100 μm, or about 1 μm to about 50 μm, or about 2 μm to about 1000 μm, about 4 μm to about 500 μm, about 10 μm to about 200 μm, or about 25 μm to about 150 μm. If the thickness of the metal layer 23 is excessively small, it is difficult for the metal layer 23 to act as a lithium reservoir. If the thickness of the metal layer 23 is excessively large, the mass and volume of the all-solid-state secondary battery 1 increase, and the cycle characteristics thereof may rather diminish. The metal layer 23 may be, for example, a metal foil having a thickness in the aforementioned ranges.

The metal layer 23 in the all-solid-state secondary battery 1*a* may be, for example, positioned between the anode current collector 21 and the anode active material layer 22 before the all-solid-state secondary battery 1 is assembled, or may be precipitated between the anode current collector 21 and the anode active material layer 22 by charging after the all-solid-state secondary battery 1 is assembled. In a case in which the metal layer 23 is disposed between the anode current collector 21 and the anode active material layer 22 before the all-solid-state secondary battery 1*a* is assembled, since the metal layer 23 is a metal layer containing lithium, the metal layer 23 acts as a lithium reservoir. For example, before the all-solid-state secondary battery 1*a* is assembled, a lithium foil is positioned between the anode current collector 21 and the anode active material layer 22. As a result, the cycle characteristics of the all-solid-state secondary battery 1*a* including the metal layer 23 are further improved. In a case in which the metal layer 23 is precipitated by charging after the all-solid-state secondary battery

1*a* is assembled, since the metal layer 23 is not included when the all-solid-state secondary battery 1*a* is assembled, the energy density of the all-solid-state secondary battery 1*a* increases. For example, when charging the all-solid-state secondary battery 1, charging is conducted exceeding the charge capacity of the anode active material layer 22. That is, the anode active material layer 22 is overcharged. At the beginning of charging, lithium is included in the anode active material layer 22. The anode active material included in the anode active material layer 22 migrates from a cathode layer 10 to form an alloy or a compound with lithium ions. When charging is exceeds the capacity of the anode active material layer 22, lithium metal is precipitated, for example, on the back of the anode active material layer 22, that is, between the anode current collector 21 and the anode active material layer, and a metal layer corresponding to the metal layer 23 is formed by the precipitated lithium. The metal layer 23 is a metal layer formed mostly of lithium (that is, lithium metal). This result is attributed to the fact that the anode active material included in the anode active material layer 22 is formed of a material that forms an alloy or a compound with lithium. During discharging, lithium in the anode active material layer 22 and the metal layer 23, that is, in metal layers, is ionized and migrates toward the cathode layer 10. Accordingly, it is possible to use lithium as an anode active material in the all-solid-state secondary battery 1*a*. In addition, the anode active material layer 22 shields the metal layer 23 and as such, can act as a protection layer of the metal layer 23 and at the same time, serve to suppress precipitation growth of lithium dendrites. Accordingly, the short-circuits and capacity decrease of the all-solid-state secondary battery 1*a* are suppressed, and as a result, the cycle characteristics of the all-solid-state secondary battery 1*a* are improved. In addition, in a case in which the metal layer 23 is positioned by charging after the all-solid-state secondary battery 1*a* is assembled, the anode current collector 21 and the anode active material layer 22, and the area therebetween, are Li-free regions that do not include lithium (Li) in an initial state or post-discharge state of the all-solid-state secondary battery 1*a*.

The anode current collector 21 is formed, for example, of a material that does not react with lithium, that is, does not form an alloy nor a compound with lithium. The material forming the anode current collector 21 may be, for example, copper (Cu), stainless steel, titanium (Ti), iron (Fe), cobalt (Co), nickel (Ni), or a combination thereof, and is not necessarily limited thereto, and may be any material that is used as a current collector in the relevant technical field. The anode current collector 21 may be formed of one of the aforementioned metals, or an alloy of two or more metals, or a shielding material. The anode current collector 21 may be, for example, in the form of a plate, or a foil.

The all-solid-state secondary battery 1 may further include, for example, a thin film containing an element capable of forming an alloy with lithium on the anode current collector 21. The thin film is positioned between the anode current collector 21 and the anode active material layer 22. The thin film includes, for example, an element capable of forming an alloy with lithium. Examples of the element capable of forming an alloy include, but are not limited to, gold, silver, zinc, tin, indium, silicon, aluminum, bismuth, a combination thereof, and may be any element that can form an alloy with lithium in the relevant technical field. The thin film may be formed of one of the aforementioned metals, or an alloy of metals of various types. As the thin film is positioned on the anode current collector 21, for example, the precipitation form of the metal layer 23 precipitated between the thin film and the anode active material layer 22 is further planarized, and the cycle characteristics of the all-solid-state secondary battery 1 can be further improved.

A thickness of the thin film may be, for example, about 1 nm to about 800 nm, about 10 nm to about 700 nm, about 50 nm to about 600 nm, or about 100 nm to about 500 nm. In a case in which the thickness of the thin film is less than 1 nm, it may be difficult for the thin film to function. If the thickness of the thin film is excessively large, lithium may be occluded in the thin film itself, causing the amount of lithium precipitated at an anode to decrease, and as a result, the energy density of the all-solid-state battery may decrease, and the cycle characteristics of the all-solid-state secondary battery 1 may diminish. The thin film may be positioned on the anode current collectors by a vacuum deposition method, a sputtering method, a plating method, but the method is not limited thereto, and may be any suitable method capable of forming a thin film in the relevant technical field.

Hereinbelow, the present inventive concept will be described in greater details with examples and comparative examples. However, the following examples are for illustrative purpose only and shall not be construed as limiting the scope of the present disclosure.

Preparation of Solid Ion Conductor Compound

Example 1

In a glove box with an Ar atmosphere, $ZrCl_4$ as a zirconium precursor, LiCl as a lithium precursor, and NaCl as a metal M precursor were introduced in a planetary ball mill in a stoichiometric ratio of 1:1.96:0.04, and zirconia (YSZ) balls were introduced therein, and the resulting mixture was subjected to a milling cycle repeatedly for 48 hours, the cycle consisting of 15 minutes of pulverization and mixing at 500 rpm under Ar atmosphere and then 5 minutes of resting. As a result, the solid ion conductor compound having a composition disclosed in Table 1 below was obtained. Subsequently, for XRD analysis, the solid ion conductor compound thus obtained was pressed by a uniaxial pressure of 300 megaPascals (MPa) to prepare a pellet having a thickness of about 1 millimeter (mm) and a diameter of about 13 mm.

Example 2

A solid ion conductor compound having a composition disclosed in Table 1 below was obtained in the same process as described in Example 1, except that the stoichiometric ratio of the zirconium precursor $ZrCl_4$, the lithium precursor LiCl, and the metal M precursor NaCl was changed to 1:1.90:0.1, and a pellet was prepared by molding the solid ion conductor compound.

Example 3

A solid ion conductor compound having a composition disclosed in Table 1 below was obtained in the same process as described in Example 1, except that the stoichiometric ratio of the zirconium precursor $ZrCl_4$, the lithium precursor LiCl, and the metal M precursor NaCl was changed to 0.99:2:0.04, and a pellet was prepared by molding the solid ion conductor compound.

Example 4

A solid ion conductor compound having a composition disclosed in Table 1 was obtained in the same process as described in Example 1, except that the stoichiometric ratio of zirconium precursor $ZrCl_4$, lithium precursor LiCl, and metal M precursor NaCl was changed to 0.98:2:0.1, and a pellet was prepared by molding the solid ion conductor compound.

Example 5

A solid ion conductor compound having a composition disclosed in Table 1 was obtained in the same process as described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor CuCl was changed to 0.99:2:0.04, and a pellet was prepared by molding the solid ion conductor compound.

Example 6

A solid ion conductor compound having a composition disclosed in Table 1 was obtained in the same process as described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor CuCl was changed to 0.99:2:0.04, and a pellet was prepared by molding the solid ion conductor compound.

Example 7

A solid ion conductor compound having a composition disclosed in Table 1 was obtained in the same process as described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor AgCl was changed to 1:1.96:0.04, and a pellet was prepared by molding the solid ion conductor compound.

Example 8

A solid ion conductor compound having a composition disclosed in Table 1 was obtained in the same process as described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor KCl was changed to 1:1.96:0.04, and a pellet was prepared by molding the solid ion conductor compound.

Example 9

A solid ion conductor compound having a composition disclosed in Table 1 was obtained in the same process as described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor KCl was changed to 1:1.90:0.1, and a pellet was prepared by molding the solid ion conductor compound.

Example 10

A solid ion conductor compound having a composition disclosed in Table 1 was obtained following the same process described in Example 1, except that the stoichiometric ratio of zirconium precursor $ZrCl_4$, lithium precursor LiCl, and metal M precursor KCl was changed to 1:1.85:0.15, and a pellet was prepared by molding the solid ion conductor compound.

Example 11

A solid ion conductor compound having a composition disclosed in Table 1 was obtained following the same process described in Example 1, except that the stoichiometric ratio of zirconium precursor $ZrCl_4$, lithium precursor LiCl, and metal M precursor NaCl was changed to 0.9:2.36:0.04, and a pellet was prepared by molding the solid ion conductor compound.

Example 12

A solid ion conductor compound having a composition disclosed in Table 1 was obtained following the same process described in Example 1, except that the stoichiometric ratio of zirconium precursor $ZrCl_4$, lithium precursor LiCl, and metal M precursor NaCl, and metal T precursor $YCl_3$ was changed to 0.5:2.45:0.05:0.5, and a pellet was prepared by molding the solid ion conductor compound.

Comparative Example 1

A solid ion conductor compound having a composition disclosed in Table 1 below was obtained in the same process as described in Example 1, except that instead of zirconium precursor $ZrCl_4$, lithium precursor LiCl, and metal M precursor NaCl, the stoichiometric ratio of lithium precursor LiCl and zirconium precursor $ZrCl_4$ was changed so as to yield a solid ion conductor compound having a composition shown in Table 1, and a pellet was prepared by molding the solid ion conductor compound.

Comparative Example 2

A solid ion conductor compound having a composition disclosed in Table 1 below was obtained in the same process as described in Example 1, except that instead of zirconium precursor $ZrCl_4$, lithium precursor LiCl, and metal M precursor NaCl, the stoichiometric ratio of lithium precursor LiCl and holmium precursor $HoCl_3$ was changed so as to yield a solid ion conductor compound having a composition shown in Table 1, and a pellet was prepared by molding the solid ion conductor compound.

Comparative Example 3

A solid ion conductor compound having a composition disclosed in Table 1 was obtained in the same process as described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and CsCl was changed so as to yield a solid ion conductor compound having a composition shown in Table 1, and a pellet was prepared by molding the solid ion conductor compound.

Comparative Example 4

A solid ion conductor compound having a composition shown in Table 1 was obtained following the same process described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor NaCl was changed so as to yield a solid ion conductor compound having a composition shown in Table 1, and a pellet was prepared by molding the solid ion conductor compound.

Comparative Example 5

A solid ion conductor compound having a composition shown in Table 1 was obtained following the same process described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor NaCl was changed so as to yield a solid ion conductor compound having a composition shown in Table 1, and a pellet was prepared by molding the solid ion conductor compound.

Comparative Example 6

A solid ion conductor compound having a composition shown in Table 1 was obtained following the same process described in Example 1, except that instead of zirconium precursor $ZrCl_4$, lithium precursor LiCl, and metal M precursor NaCl, the stoichiometric ratio of zirconium precursor $ZrCl_4$, lithium precursor LiCl, and metal M precursor NaCl was changed so as to yield a solid ion conductor compound having a composition shown in Table 1, and a pellet was prepared by molding the solid ion conductor compound.

Comparative Example 7

A solid ion conductor compound having a composition shown in Table 1 was obtained following the same process described in Example 1, except that instead of zirconium precursor $ZrCl_4$, lithium precursor LiCl, and metal M precursor NaCl, the stoichiometric ratio of zirconium precursor $ZrCl_4$ and lithium precursor LiCl was changed so as to yield a solid ion conductor compound having a composition shown in Table 1, and a pellet was prepared by molding the solid ion conductor compound.

Preparation of All-Solid Secondary Battery

Example 13

Preparation of Cathode Layer

A $Li_2ZrO_{3-}$ $LiNi_{0.9}Co_{0.05}Mn_{0.05}O_2$(LZO-NCM) cathode active material was prepared by coating $LiNi_{0.9}Co_{0.05}Mn_{0.05}O_2$(NCM) as a cathode active material, with $Li_2ZrO_3$ (LZO). Powder was prepared by pulverizing the pellet of the solid ion conductor compound prepared in Example 1 as a solid electrolyte. Carbon nanofibers (CNF) was prepared as a conductor. A cathode mix was prepared by mixing the LZO-NCM cathode active material: the solid electrolyte: the conductor in a weight ratio of 60:52:5.

Preparation of Solid Electrolyte Powder

Solid electrolyte powder was prepared by pulverizing the solid ion conductor compound prepared in Example 1, using an agate mortar.

Also, $Li_6PS_5Cl$ solid electrolyte ($Li_6PS_5Cl$; purchased from Mitsui) was prepared.

Preparation of Anode Layer

As an anode, a metal lithium foil having a thickness of 20 μm was prepared.

Preparation of All-Solid Secondary Battery

On a stainless steel (SUS) lower electrode, an anode layer, the $Li_6PS_5Cl°$ solid electrolyte, the solid electrolyte powder prepared in Example 1, and a cathode mix were sequentially laminated, and pressed on one side at a pressure of 300 MPa for 3 minutes, to thereby produce an all-solid-state secondary battery.

Comparative Example 8

Preparation of Cathode Layer

An LZO-NCM cathode active material was prepared by coating $LiNi_{0.9}Co_{0.05}Mn_{0.05}O_2$(NCM) as a cathode active material, with $Li_2ZrO_3$ (LZO). A powder was prepared by pulverizing the pellet of the solid ion conductor compound prepared in Comparative Example 1 as a solid electrolyte. Carbon nanofiber (CNF) was prepared as a conductor. A cathode mix was prepared by mixing the cathode active material: the solid electrolyte: the conductor in a weight ratio of 60:52:5.

Preparation of Solid Electrolyte Powder

Solid electrolyte powder was prepared by pulverizing the solid ion conductor compound prepared in Comparative Example 1, using an agate mortar.

Also, the $Li_6PS_5Cl$ solid electrolyte ($Li_6PS_5Cl$; purchased from Mitsui) was prepared.

Preparation of Anode Layer

As an anode, a metal lithium foil having a thickness of 20 μm was prepared.

Preparation of All-Solid Secondary Battery

On an SUS lower electrode, an anode layer, the $Li_6PS_5Cl$ solid electrolyte, the solid electrolyte powder prepared in Comparative Example 1, and a cathode mix were sequentially laminated, and pressed at a pressure of 300 MPa for 3 minutes by a cold isostatic press (Cl P), to thereby produce an all-solid-state secondary battery.

Comparative Example 9

Preparation of Cathode Layer

An LZO-NCM cathode active material was prepared by coating $LiNi_{0.9}Co_{0.05}Mn_{0.05}O_2$(NCM) as a cathode active material, with $Li_2ZrO_3$ (LZO). The $Li_6PS_5Cl$ solid electrolyte ($Li_6PS_5Cl$; purchased from Mitsui) was prepared as a solid electrolyte. Carbon nanofiber (CNF) was prepared as a conductor. A cathode mix was prepared by mixing the cathode active material: the solid electrolyte: the conductor in a weight ratio of 60:52:5.

Preparation of Solid Electrolyte Powder

The $Li_6PS_5Cl$ solid electrolyte ($Li_6PS_5Cl$; purchased from Mitsui) was prepared.

Preparation of Anode Layer

As an anode, a metal lithium foil having a thickness of 20 μm was prepared.

Preparation of All-Solid Secondary Battery

On an SUS lower electrode, an anode layer, a known solid electrolyte, and a cathode mix were sequentially laminated, and pressed at a pressure of 300 MPa for 3 minutes by a Cl P, to thereby produce an all-solid-state secondary battery.

Evaluation Example 1: X-ray Diffraction Testing

A powder was prepared by pulverizing the solid ion conductor compounds prepared in Example 1 and Comparative Examples 1 and 2, using an agate mortar, and was analyzed by powder X-ray diffraction using Cu Kα radiation. The results are shown in FIG. 1. With respect to Comparative Example 1, the position of the peak at 32.3°2θ, and the full width at half maximum (FWHM) changes are shown in FIG. 2, and lattice constants of crystal structures were calculated and shown in FIG. 3.

Figure 2:
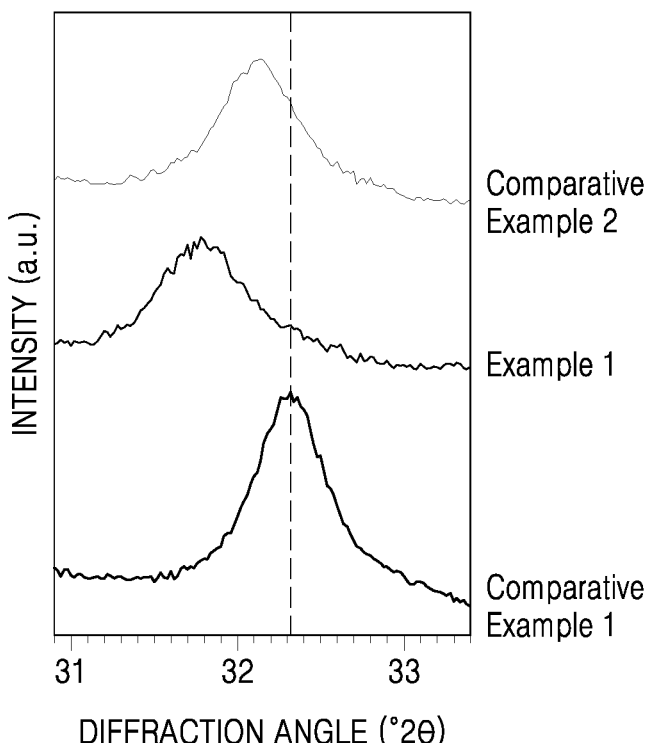
FIG. 2 is a graph of intensity (arbitrary units, a.u.) versus diffraction angle (°2θ) showing a shift in Example 1 and Comparative Example 2 with respect to the position of the peaks at 32.3°2θ of Comparative Example 1 of the XRD spectrum of FIG. 1.
Figure 3:
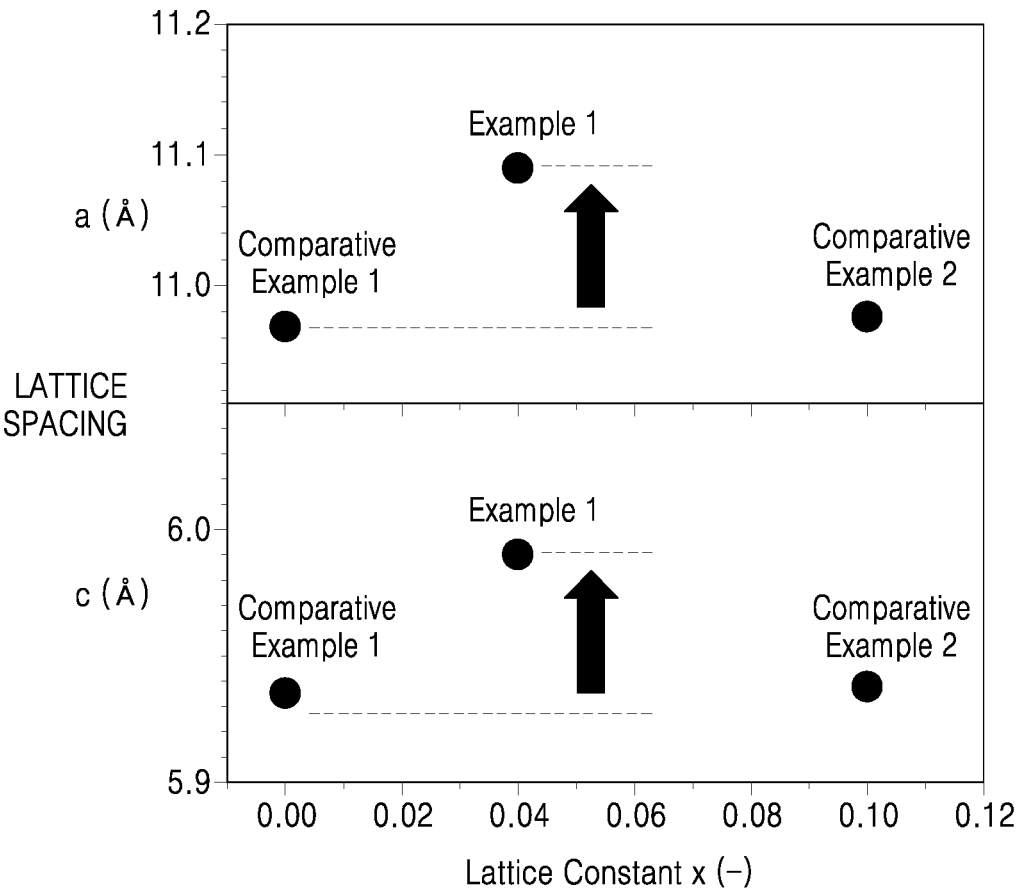
FIG. 3 is a graph of lattice spacing (Angstroms, A) versus lattice constant showing a crystal lattice constant of the solid ion conductor compounds prepared in Example 1 and Comparative Examples 1 and 2.

Referring to FIG. 1 to FIG. 3, it was confirmed that Example 1 and Comparative Example 1 all include the same crystal structure of P3m1 space group, and that as the lattice constant increased by Na doping, the lattice volume increased by about 19%.

Evaluation Example 2: Measurement of Ionic Conductivity

The solid ion conductor compounds prepared in Examples 1 to 12 and Comparative Examples 1 to 7 were pulverized by an agate mortar to prepare powder, and the powder was pressed at a pressure of 4 ton/cm$^2$ for 2 minutes, to prepare a pellet having a thickness of about 1 mm and a diameter of about 13 mm. A platinum (Pt) electrode having a thickness of 10 μm and a diameter of 13 mm was disposed by sputtering platinum on both sides of a prepared sample, to thereby prepare a symmetrical cell. The preparation of the symmetrical cell was conducted in a glove box under Ar atmosphere.

For the sample having the platinum electrode disposed on both sides thereof, the impedance of a pellet was measured by a 2-probe method using an impedance analyzer (VMP-3). The frequency range was 1 hertz (Hz) to 1 megaHertz (MHz), and the amplitude voltage was 20 millivolts (mV). The measurement was made at 25° C. in an Ar atmosphere. Resistance values were obtained from the arc of the Nyquist plot from the impedance measurement results, and ionic conductivity was calculated, with the surface area and thickness of the sample taken into consideration. The results of measurement are shown in Table 1.

Referring to Table 1, compared to Comparative Example 2, which was free of Zr, and Comparative Example 1, which contained Zr but free of element M, the disclosed ion conductor provided an ionic conductivity improved up to 10 times. Further, the disclosed ion conductor provided superior ionic conductivity, compared to Comparative Example 3 containing an element that has a larger ionic radius than the element M used in Examples.

Additionally, when a ratio (b/d) of a molar fraction (b) of the element M and a molar fraction (d) of a halogen, and a ratio (c/d) of a molar fraction (c) of Zr element and a molar fraction (d) of a halogen element, Examples satisfying 0<b/d<0.03 and 0.05<c/d<0.18 showed superior ion conductivity compared to Comparative Examples 1, 2, and 4 to 7 which do not satisfy these ranges.

This result suggests that the ratio of molar fractions of the element M and halogen, and the ratio of molar fractions of the element Zr and halogen element, together with the ionic radius of the element M, affect the ionic conductivity.

TABLE 1

| Composition $(Li_aM_bZr_cX_dT_e)$ | b/d | c/d | Ionic conductivity (S cm$^{-1}$) |
|---|---|---|---|
| Example 1 | $Li_{1.96}Na_{0.04}ZrCl_6$ | 0.01 | 0.17 | $1.1 \times 10^{-3}$ |
| Example 2 | $Li_{1.9}Na_{0.1}ZrCl_6$ | 0.02 | 0.17 | $5.5 \times 10^{-4}$ |
| Example 3 | $Li_2Na_{0.04}Zr_{0.99}Cl_6$ | 0.01 | 0.17 | $9.0 \times 10^{-4}$ |
| Example 4 | $Li_2Na_{0.1}Zr_{0.98}Cl_6$ | 0.02 | 0.17 | $5.6 \times 10^{-4}$ |
| Example 5 | $Li_{1.96}Cu_{0.04}ZrCl_6$ | 0.01 | 0.17 | $6.9 \times 10^{-4}$ |
| Example 6 | $Li_2Cu_{0.04}Zr_{0.99}Cl_6$ | 0.01 | 0.17 | $8.9 \times 10^{-4}$ |
| Example 7 | $Li_{1.96}Ag_{0.04}ZrCl_6$ | 0.01 | 0.17 | $5.4 \times 10^{-4}$ |
| Example 8 | $Li_{1.96}K_{0.04}ZrCl_6$ | 0.01 | 0.17 | $4.6 \times 10^{-4}$ |
| Example 9 | $Li_{1.9}K_{0.1}ZrCl_6$ | 0.02 | 0.17 | $4.4 \times 10^{-4}$ |
| Example 10 | $Li_{1.85}K_{0.15}ZrCl_6$ | 0.025 | 0.17 | $2.5 \times 10^{-4}$ |
| Example 11 | $Li_{2.36}Na_{0.04}Zr_{0.9}Cl_6$ | 0.01 | 0.15 | $4.2 \times 10^{-4}$ |
| Example 12 | $Li_{2.45}Na_{0.05}Zr_{0.5}Cl_6Y_{0.5}$ | 0.01 | 0.08 | $1.1 \times 10^{-3}$ |

TABLE 1-continued

| Composition ($Li_aM_bZr_cX_dT_e$) | b/d | c/d | Ionic conductivity (S cm$^{-1}$) |
|---|---|---|---|
| Comparative Example 1 | $Li_2ZrCl_6$ | — | 0.17 | $4.0 \times 10^{-4}$ |
| Comparative Example 2 | $Li_3HoCl_6$ | — | — | $2.0 \times 10^{-4}$ |
| Comparative Example 3 | $Li_{1.96}Cs_{0.04}ZrCl_6$ | 0.01 | 0.17 | $2.3 \times 10^{-4}$ |
| Comparative Example 4 | $Li_{4.76}Na_{0.04}Zr_{0.3}Cl_6$ | 0.01 | 0.05 | $3.5 \times 10^{-6}$ |
| Comparative Example 5 | $Li_{1.16}Na_{0.04}Zr_{1.2}Cl_6$ | 0.01 | 0.2 | $1.7 \times 10^{-4}$ |
| Comparative Example 6 | $Li_{1.75}Na_{0.25}ZrCl_6$ | 0.04 | 0.17 | $9.1 \times 10^{-5}$ |
| Comparative Example 7 | $Li_{1.6}Zr_{1.1}Cl_6$ | — | 0.18 | $2.3 \times 10^{-4}$ |

Evaluation Example 3: Cycling Evaluation

Charge-discharge characteristics of the all-solid-state secondary batteries prepared in Example 13 and Comparative Examples 8 and 9 were evaluated by the following charge-discharge test.

In the first cycle of the charge-discharge test, until a battery voltage reached 4.2 V, the battery was charged at a constant current of 0.1 C and a constant voltage of 4.2 V until a current value of 0.1 C was reached (CCCV). Subsequently, the battery was discharged at a constant current of 0.1 C until a voltage of 2.5 V was reached. A C rate means a current which will discharge a battery in one hour, e.g., a C rate for a battery having a discharge capacity of 1 ampere-hour would be 1 ampere.

Figure 4:
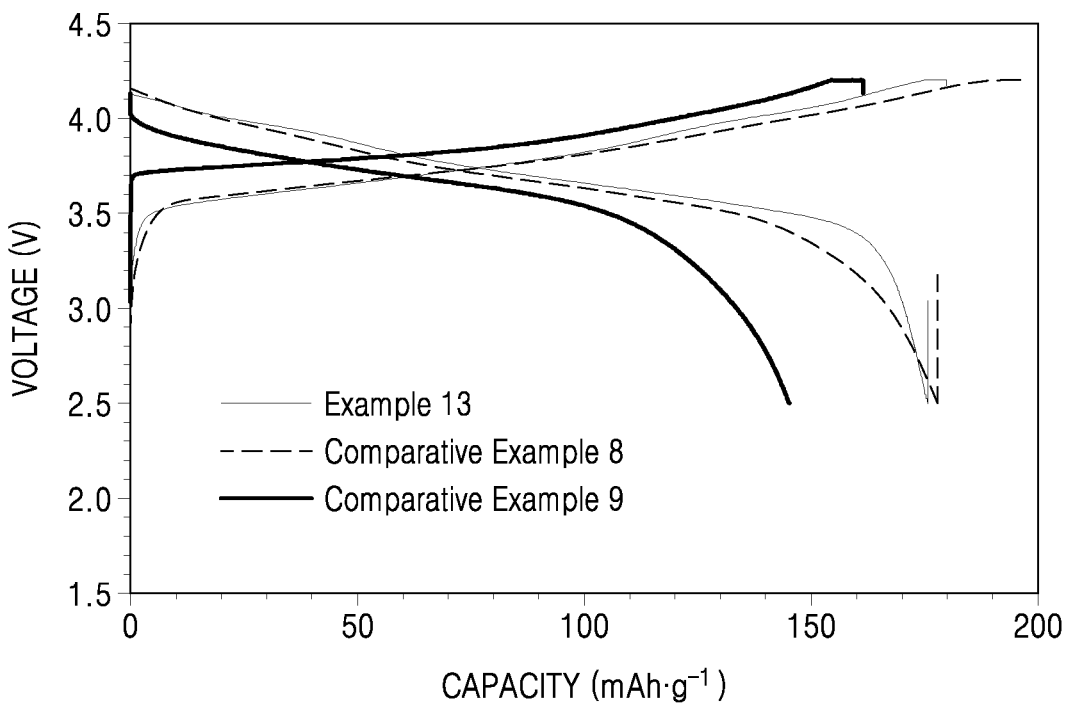
FIG. 4 is a graph of voltage (Volts, V) versus capacity (mah·g$^{-1}$) showing an initial charge-discharge curve of the all-solid-state secondary batteries of Example 13 and Comparative Examples 8 and 9.

Initial efficiencies are shown in Table 2 and the initial charge-discharge curves are shown in FIG. 4.

Referring to Table 2 and FIG. 4, it was confirmed that the initial efficiency of Example 13 improved compared to Comparative Examples 8 and 9.

TABLE 2

| | Initial Efficiency |
|---|---|
| Example 13 | 96% |
| Comparative Example 8 | 93% |
| Comparative Example 9 | 88% |

After the initial efficiency evaluation, until a battery voltage reached 4.2 V, the battery was charged at a constant current of 0.1 C and a constant voltage of 4.2 V until a current value of 0.1 C was reached. Subsequently, the battery was discharged at a constant current of 0.1 C until a voltage of 2.5 V was reached. The above charge-discharge cycle was performed 20 times. Capacity was measured for each cycle and is shown in FIG. 5.

Figure 5:
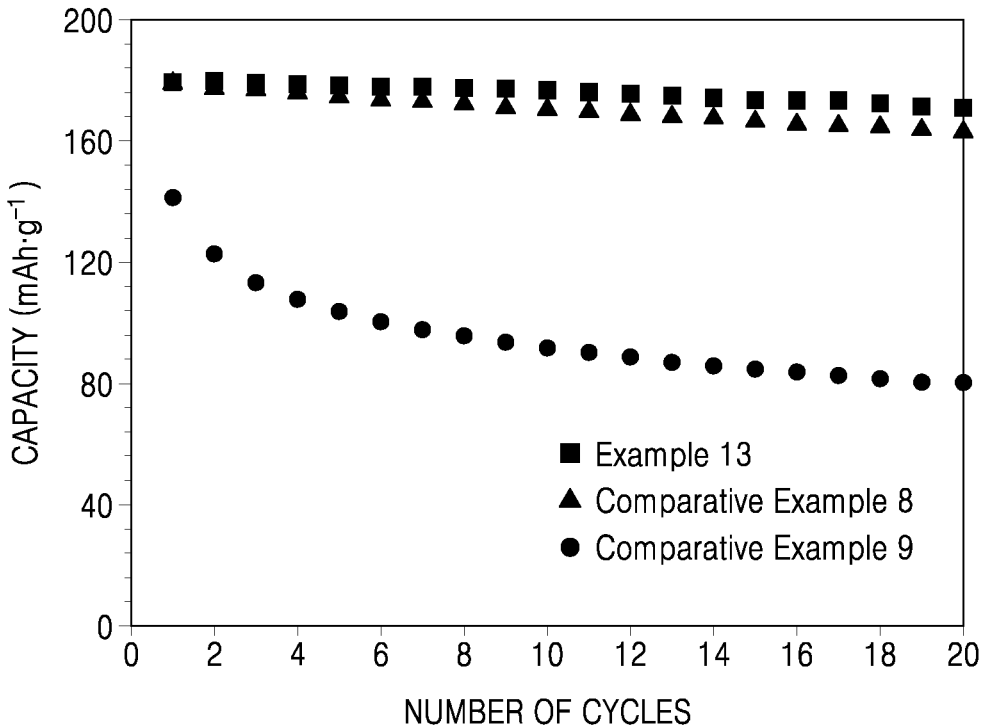
FIG. 5 is a graph of capacity (mah·g$^{-1}$) versus number of cycles showing cycle characteristics of all-solid-state secondary batteries of Example 13 and Comparative Examples 8 and 9.

Referring to FIG. 5, the capacities of Comparative Examples 8 and 9 had a gradually or drastically decreasing trend, but the all-solid-state battery of Example 13 showed a Coulombic efficiency of 99.7% or more, thus showing that the capacity remained mostly uniform.

Evaluation Example 4: Interfacial Resistance Evaluation

For the all-solid-state batteries in Example 13 and Comparative Example 9, initial impedances were evaluated by measuring resistance with a voltage bias of 20 mV in a frequency range of $10^6$ Hz to 0.1 MHz according to the 2-probe method using an impedance analyzer (VMP-3). The resulting Nyquist plot is shown in FIG. 6.

Figure 6:
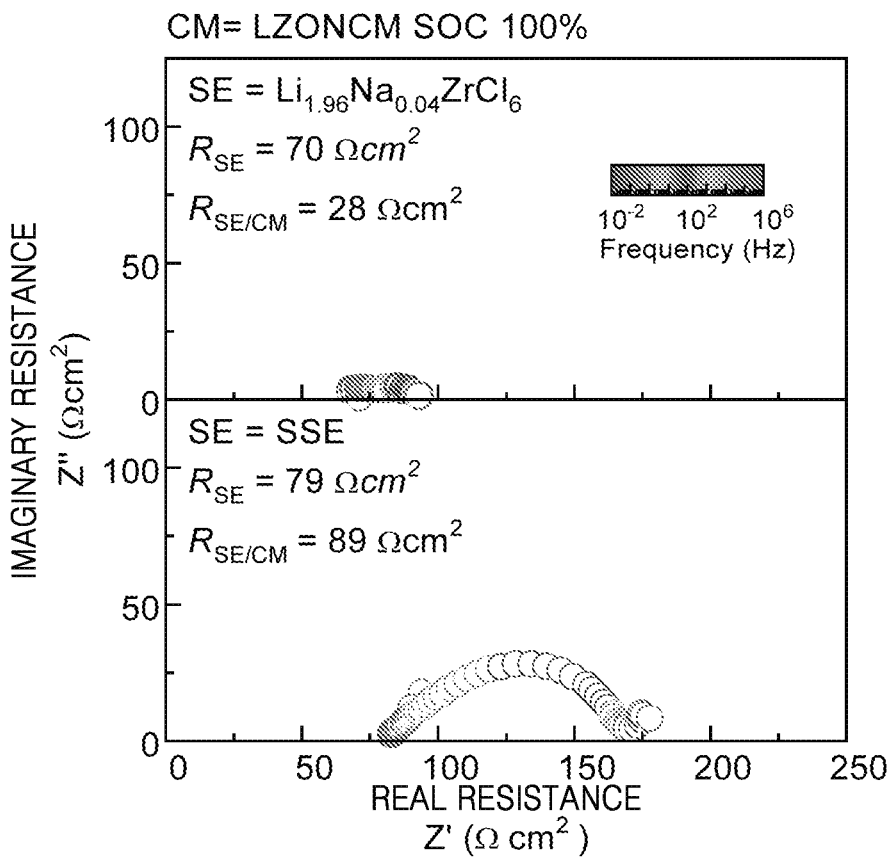
FIG. 6 is a graph of imaginary resistance (Z", ohms-square centimeters, Ω·cm$^2$) versus real resistance (ohms-square centimeters, Ω·cm$^2$) showing an evaluation of initial impedance of the all-solid-state secondary batteries of Example 13 and Comparative Example 9.

Referring to FIG. 6, it was confirmed that compared to the all-solid-state battery in Comparative Example 9, using a $Li_6PS_5Cl$ sulfide-based solid electrolyte, the all-solid-state battery of Example 13 had a lower interfacial resistance at both electrodes and as a result, showed good ion conduction.

According to an aspect, there may be provided an electrochemical cell having improved stability and cycle characteristics by including a solid ion conductor compound with improved lithium ion conductivity and stability with respect to lithium metal.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor compound represented by Formula 1:

$$Li_aM_bZr_cX_dT_e \qquad \text{Formula 1}$$

wherein in Formula 1, $1<a<3.5$, $0<b<1.5$, $0<c<1.5$, $0<d<7$, $0\leq e<1$, $0<b/d<0.03$, and $0.05<c/d<0.18$, M is at least one monovalent metal element other than lithium, and T is a metal element different from M, a transition metal element, a post-transition metal element, a metalloid element, or a combination thereof, wherein an ionic radius of M satisfies 90 pm$<M_r\leq180$ μm, wherein $M_r$ is an ionic radius of M, and X is at least one halogen.

2. The solid ion conductor compound of claim 1, wherein M comprises Na, K, Rb, Mo(I), Cu(I), Hg, Ag, Au, Tl, or a combination thereof.

3. The solid ion conductor compound of claim 1, wherein T is B, Be, Mg, Ca, Sr, Se, Y, Ti, Hf, V, Nb, Ta, Cr, W, Mn, Tc, Re, Fe, Ru, Os, Co, Rh, Ir, Ni, Pd, Pt, Zn, Cd, Al, Ga, In, Ge, Sn, Pb, Sb, Bi, Po, or a combination thereof.

4. The solid ion conductor compound of claim 1, wherein X comprises Cl, Br, or a combination thereof.

5. The solid ion conductor compound of claim 1, wherein $M_r$ satisfies 90 pm$<M_r\leq160$ pm.

6. The solid ion conductor compound of claim 1, wherein a satisfies $1.5\leq a\leq2.5$, b satisfies $0<b<0.5$, c satisfies $0.1\leq c<1.5$, and d satisfies $5<d<7$.

7. The solid ion conductor compound of claim 1, wherein e satisfies $0<e<1$.

8. The solid ion conductor compound of claim 1, wherein $0.01\leq b/d\leq0.02$.

9. The solid ion conductor compound of claim 1, wherein $0.06\leq c/d\leq0.17$.

10. The solid ion conductor compound of claim 1, wherein $1<a/c<5$.

11. The solid ion conductor compound of claim 1, wherein the solid ion conductor compound has at least one diffraction peak at diffraction angles of about 15°2θ to about 17°2θ, about 30° 2θ to about 32°2θ, and about 40° 2θ to about 42°2θ, when analyzed by X-ray diffraction using CuKα radiation.

12. The solid ion conductor compound of claim 1, wherein the solid ion conductor compound has a diffraction peak at diffraction angles of $16.0°2\theta+2.0°2\theta$, $30.4°2\theta+2.0°2\theta$, $31.8°2\theta+2.0°2\theta$, $34.1°2\theta+2.0°2\theta$, $41.3°2\theta+2.0°2\theta$, and $49.4°2\theta+2.0°2\theta$ when analyzed by X-ray diffraction using CuK$\alpha$ radiation.

13. The solid ion conductor compound of claim 1, wherein the solid ion conductor compound comprises a crystalline phase, or a combination of crystalline phase and amorphous phase.

14. The solid ion conductor compound of claim 13, wherein the crystalline phase comprises a layered rock-salt crystal structure.

15. The solid ion conductor compound of claim 13, wherein the crystalline phase comprises a crystal of a C2/m space group, a crystal of a P3m1 space group, or a combination thereof.

16. The solid ion conductor compound of claim 1, wherein the solid ion conductor compound has an a-axis lattice constant and a c-axis lattice constant that are each greater than an a-axis lattice constant and a c-axis lattice constants when the at least one monovalent metal element M is not present.

17. The solid ion conductor compound of claim 1, wherein the solid ion conductor compound has an ionic conductivity of $2.4 \times 10^{-4}$ S/cm or more at $25°$ C.

18. The solid ion conductor compound of claim 1, wherein the solid ion conductor compound is $Li_{1.96}Na_{0.03}ZrCl_6$, $Li_{1.96}Na_{0.04}ZrCl_6$, $Li_{1.9}Na_{0.1}ZrCl_6$, $Li_2Na_{0.04}Zr_{0.99}Cl_6$, $Li_2Na_{0.1}Zr_{0.98}Cl_6$, $Li_{1.96}Cu_{0.04}ZrCl_6$, $Li_2Cu_{0.04}Zr_{0.99}Cl_6$, $Li_{1.96}Ag_{0.04}ZrCl_6$, $Li_{1.96}K_{0.04}ZrCl_6$, $Li_{1.96}Na_{0.04}Y_{0.5}Zr_{0.5}Cl_6$, $Li_{1.9}K_{0.1}ZrCl_6$, $Li_{1.85}K_{0.15}ZrCl_6$, $Li_{2.36}Na_{0.04}Zr_{0.9}Cl_6$, or $Li_{2.45}Na_{0.05}Zr_{0.5}Cl_6Y_{0.5}$.

19. A method of preparing a solid ion conductor compound, the method comprising:

providing a mixture of a zirconium precursor compound, a lithium precursor compound, and a metal element M precursor compound, wherein the metal element M is at least one monovalent metal element other than lithium, and an ionic radius of the metal element M satisfies 90 pm<$M_r$≤180 μm, wherein $M_r$ is an ionic radius of M; and treating the mixture to form the solid ion conductor compound.

20. The method of claim 19, wherein the treating comprises ball-milling the mixture in a dry and inert atmosphere.

* * * * *